US010698742B2

(12) United States Patent
Barsness et al.

(10) Patent No.: US 10,698,742 B2
(45) Date of Patent: *Jun. 30, 2020

(54) OPERATION EFFICIENCY MANAGEMENT WITH RESPECT TO APPLICATION COMPILE-TIME

(71) Applicant: International Business Machines Corporation, Armonk, NY (US)

(72) Inventors: Eric L. Barsness, Pine Island, MN (US); Daniel E. Beuch, Rochester, MN (US); Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 256 days.

This patent is subject to a terminal disclaimer.

(21) Appl. No.: 15/451,054

(22) Filed: Mar. 6, 2017

(65) Prior Publication Data

US 2018/0253338 A1 Sep. 6, 2018

(51) Int. Cl.
*G06F 9/46* (2006.01)
*G06F 9/50* (2006.01)
*G06F 8/41* (2018.01)
*G06F 16/901* (2019.01)
*G06F 8/36* (2018.01)

(52) U.S. Cl.
CPC .............. *G06F 9/5083* (2013.01); *G06F 8/36* (2013.01); *G06F 8/433* (2013.01); *G06F 9/50* (2013.01); *G06F 16/9024* (2019.01); *G06F 2209/5011* (2013.01)

(58) Field of Classification Search
None
See application file for complete search history.

(56) References Cited

U.S. PATENT DOCUMENTS

| 8,910,133 | B2 * | 12/2014 | Byers ................... G06F 8/36 717/145 |
|---|---|---|---|
| 9,971,633 | B1 | 5/2018 | Barsness |
| 2007/0143452 | A1 | 6/2007 | Suenbuel et al. |
| 2009/0171990 | A1 | 7/2009 | Naef, III |
| 2009/0224941 | A1 | 9/2009 | Kansal et al. |

(Continued)

OTHER PUBLICATIONS

Schneider et al.; "Tutorial: Stream Processing Optimizations"; Proceedings of the 7th ACM international conference on Distributed event-based systems, pp. 249-258, Jun. 29, 2013; <http://citeseerx.ist.psu.edu/viewdoc/download?doi=10.1.1.374.4263&rep=rep1&type=pdf>.

(Continued)

*Primary Examiner* — Diem K Cao
(74) *Attorney, Agent, or Firm* — Issac J. Gooshaw

(57) ABSTRACT

Disclosed aspects relate to operation efficiency management in a shared pool of configurable computing resources. A first set of processing operations of a first application may be detected. A second set of processing operations of a second application may be detected. The first set of processing operations of the first application may be compared with the second set of processing operations of the second application. A substantial match of the first and second processing operations of the first and second applications may be determined. A single set of processing operations for both the first and second applications may be compiled.

20 Claims, 14 Drawing Sheets

(56) References Cited

U.S. PATENT DOCUMENTS

| | | |
|---|---|---|
| 2014/0365614 A1 | 12/2014 | Branson |
| 2015/0295807 A1 | 10/2015 | Huang et al. |
| 2016/0253219 A1* | 9/2016 | Chen ................ G06F 17/18 718/106 |
| 2016/0267143 A1 | 9/2016 | Barsness et al. |
| 2016/0267197 A1 | 9/2016 | Barsness et al. |
| 2018/0253337 A1 | 9/2018 | Barsness |
| 2018/0253339 A1 | 9/2018 | Barsness |
| 2018/0253340 A1 | 9/2018 | Barsness |

OTHER PUBLICATIONS

Mell, Peter, et al., The NIST Definition of Cloud Computing, National Institute of Standards and Technology, Oct. 7, 2009, Version 15, NIST, Gaithersburg, MD, US.

List of IBM Patents or Patent Applications Treated As Related.

International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>.

IBM Appendix P, "List of IBM Patents or Patent Applications Treated as Related", Dated Oct. 6, 2017, 2 pages.

Barsness et al., "Operation Efficiency Management With Respect to Application Compile-Time", U.S. Appl. No. 15/726,629, filed Oct. 6, 2017, pp. 1-82.

IBM Appendix P, "List of IBM Patents or Patent Applications Treated as Related", Dated Mar. 28, 2018, 2 pages.

Barsness et al., "Operation Efficiency Management With Respect to Application Compile-Time", U.S. Appl. No. 15/938,023, filed Mar. 28, 2018, pp. 1-82.

Barsness et al., "Operation Efficiency Management With Respect to Application Compile-Time", U.S. Appl. No. 15/938,074, filed Mar. 28, 2018, pp. 1-82.

Barsness et al., "Operation Efficiency Management With Respect to Application Run-Time", U.S. Appl. No. 15/451,023, pp. 1-112.

\* cited by examiner

OPERATION EFFICIENCY MANAGEMENT WITH RESPECT TO APPLICATION COMPILE-TIME

BACKGROUND

This disclosure relates generally to computer systems and, more particularly, relates to operation efficiency management in a shared pool of configurable computing resources. The amount of data that needs to be managed by enterprises is increasing. Operation efficiency management may be desired to be performed as efficiently as possible. As data needing to be managed increases, the need for operation efficiency management may also increase.

SUMMARY

Aspects of the disclosure relate to operation efficiency management in a shared pool of configurable computing resources. Operational or structural redundancies may be detected with respect to application run-time or based on metadata generated at application compile time. Redundancies may be detected with respect to the structure of running applications. For instance, multiple stream computing applications may make use of the same stream operators as one another, resulting in a structural equivalency. In some situations, redundancies may be detected with respect to the output data produced by two or more application segments. As an example, output tuples produced by a set of operators of an application may be substantially equivalent with respect to the output tuples produced by a set of operators of another application in the same distributed computing environment. Based on detection of operational or structural equivalencies between applications, a shared application segment may be created to manage the redundancy.

Disclosed aspects relate to operation efficiency management in a shared pool of configurable computing resources. A first set of processing operations of a first application may be detected. A second set of processing operations of a second application may be detected. The first set of processing operations of the first application may be compared with the second set of processing operations of the second application. A substantial match of the first and second processing operations of the first and second applications may be determined. A single set of processing operations for both the first and second applications may be compiled.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
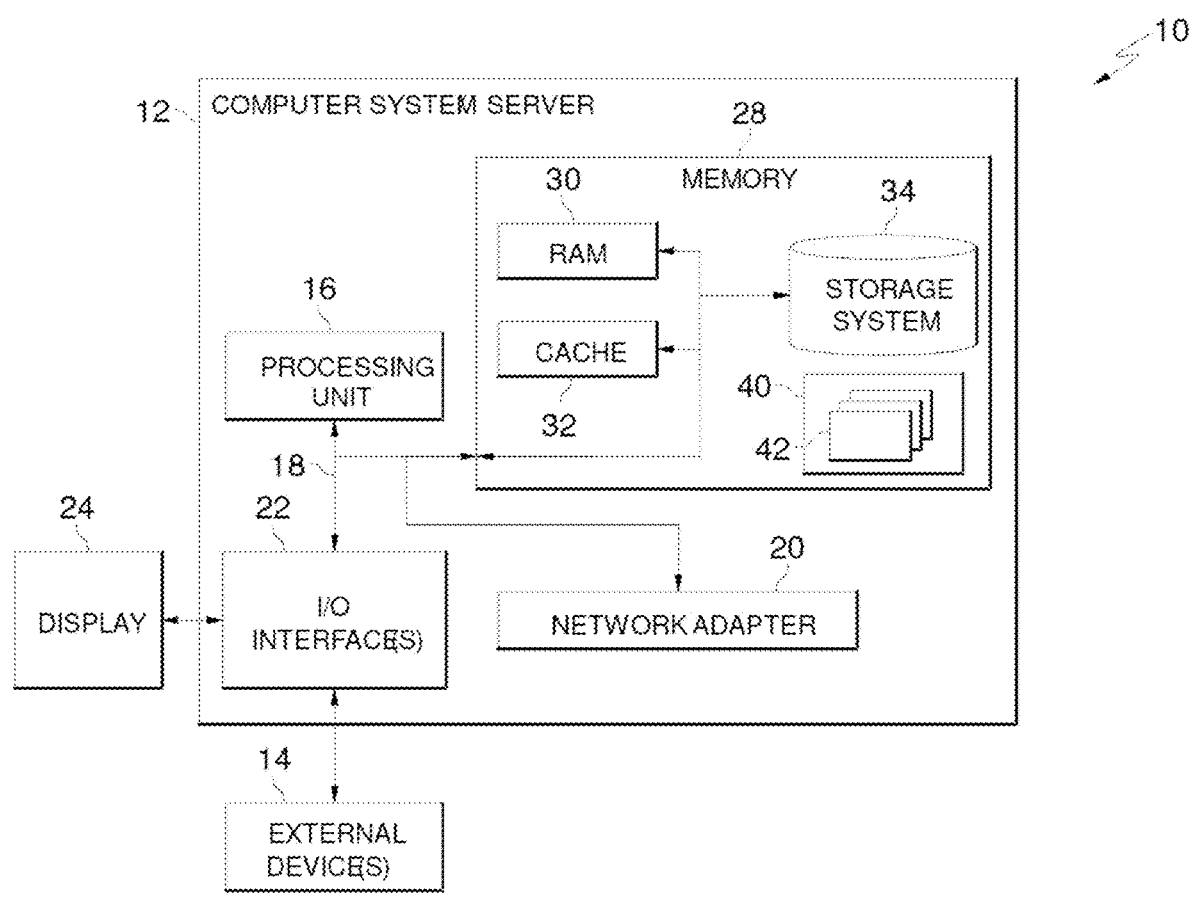
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to operation efficiency management in a shared pool of configurable computing resources. Operational or structural redundancies may be detected with respect to application run-time or based on metadata generated at application compile time. Redundancies may be detected with respect to the structure of running applications. For instance, multiple stream computing applications may make use of the same stream operators (e.g., data ingest operators, filter operators, join operators) as one another, resulting in a structural equivalency. In some situations, redundancies may be detected with respect to the output data produced by two or more application segments. As an example, output tuples produced by a set of operators of an application may be substantially equivalent with respect to the output tuples produced by a set of operators of another application in the same distributed computing environment. Based on detection of operational or structural equivalencies between applications, a shared application segment may be created to manage (e.g., limit, prevent, eliminate) the redundancy. Leveraging redundancy detection and elimination with respect to running applications in a shared pool of configurable computing resources may be associated with application processing efficiency, flexibility, and performance.

In distributed computing environments, computing applications from multiple different tenants may be hosted on the same hosts to share host infrastructure and resources. Aspects of the disclosure relate to the recognition that, in some situations, computing applications (e.g., belonging to different tenants) stored on the same host infrastructure may share similar application structures or produce equivalent output data, resulting in structural or operational redundancies. Accordingly, aspects of the disclosure relate to detecting redundancies in the structure or data output of two or more computing applications in a distributed computing environment, and creating a shared application segment to manage the redundancy between the two or more computing applications. As such, resource usage efficiency, application performance, and infrastructure cost savings may be facilitated with respect to computing applications in a distributed computing environment.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system, and computer program product for operation efficiency management in a shared pool of configurable computing resources. A first set of processing operations of a first application may be detected (e.g., a first portion of processing operations of a totality of processing operations of the first application). A second set of processing operations of a second application may be detected (e.g., a second portion of processing operations of a totality of processing operations of the second application). The first set of processing operations of the first application may be compared with the second set of processing operations of the second application. A substantial match of the first and second processing operations of the first and second applications may be determined. A single set of processing operations for both the first and second applications may be established. A single set of processing operations for both the first and second applications may be compiled.

In embodiments, both the first and second applications may be carried-out using the single set of processing operations. In embodiments, the shared pool of configurable computing resources may include a plurality of tenants including both a first tenant and a second tenant. It may be detected that the first tenant corresponds to the first application and that the second tenant corresponds to the second application, and the single set of processing operations for both the first and second applications of both the first and second tenants may be established. In embodiments, a first structure of the first set of processing operations of the first application may be compared with a second structure of the second set of processing operations of the second application, a structural match of the first and second structures of the first and second processing operations of the first and second applications may be determined, and a single structure of the single set of processing operations may be established for both the first and second applications in the shared pool of configurable computing resources. In embodiments, a first set of stream operator parameters of the first set of stream computing processing operations of the first stream computing application may be compared with a second set of stream operator parameters of the second set of stream computing processing operations of the second stream computing application, a substantial stream operator parameter match of the first and second sets of stream operator parameters of the first and second stream computing processing operations of the first and second stream computing applications may be determined, and a single set of stream operator parameters of the single set of stream computing processing operations may be established for both the first and second stream computing applications in the shared pool of configurable computing resources. Altogether, performance or efficiency benefits with respect to operation efficiency in a distributed batch data processing environment may occur (e.g., speed, flexibility, load balancing, responsiveness, high availability, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
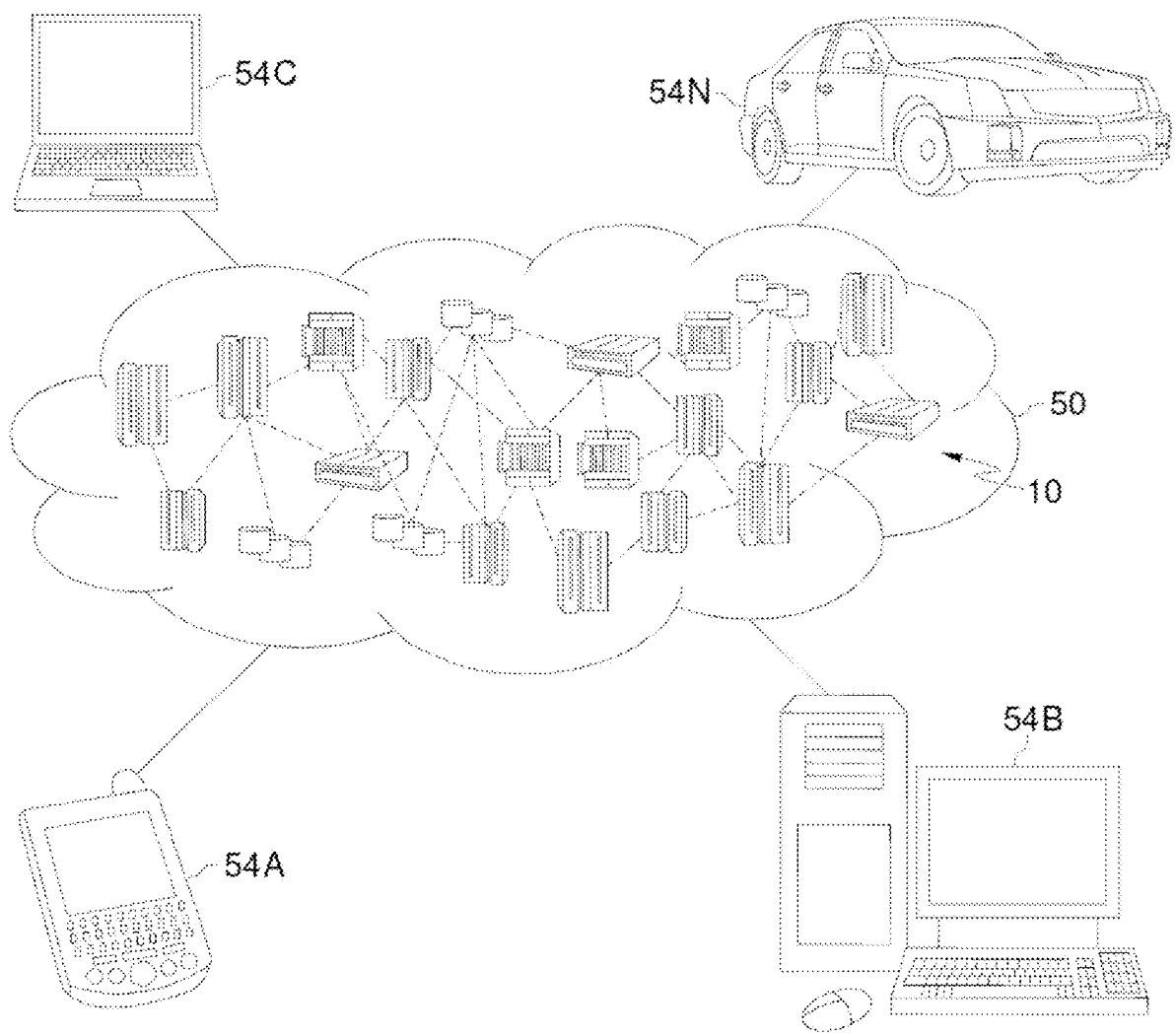
FIG. 2 depicts a cloud computing environment according to embodiments.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
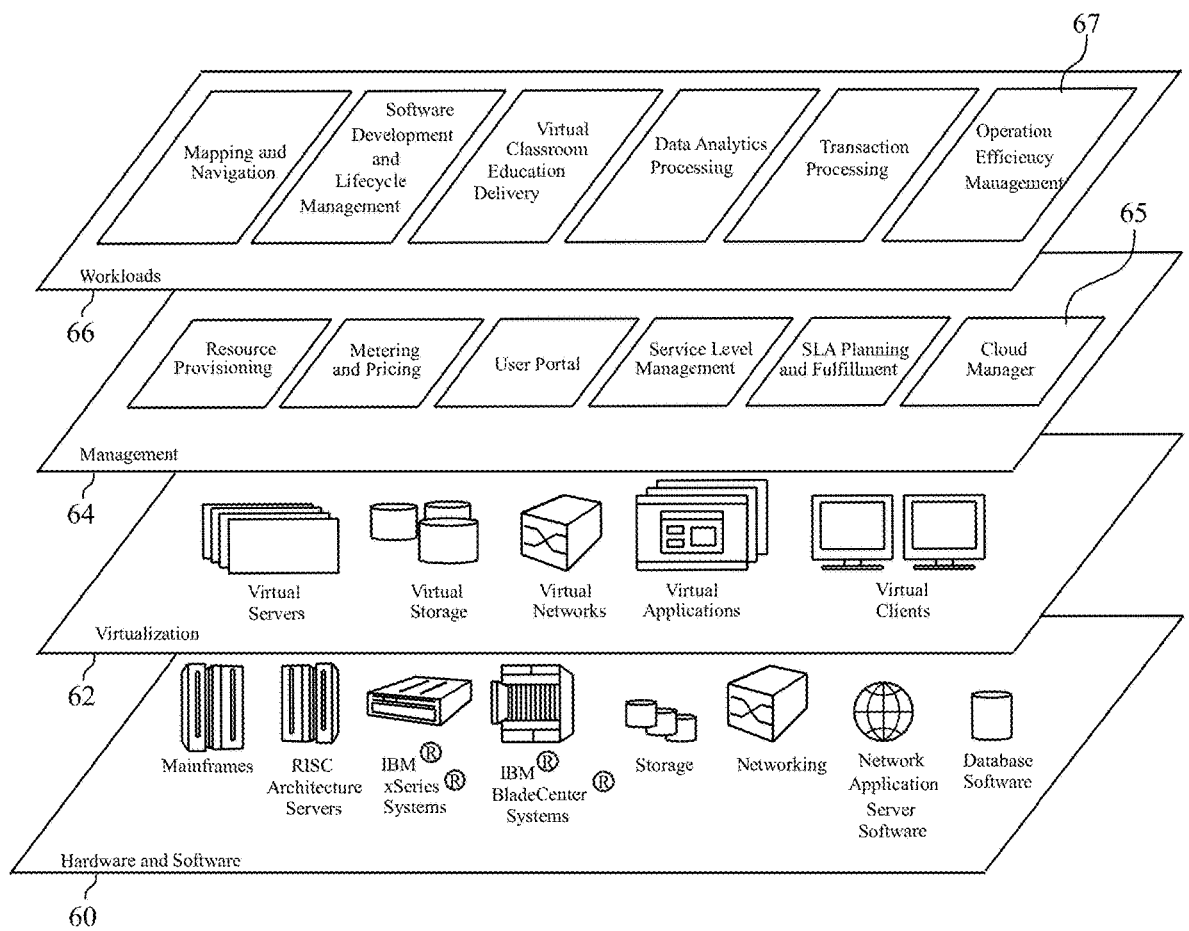
FIG. 3 depicts abstraction model layers according to embodiments.

Referring now to FIG. 3, a set of functional abstraction layers provided by cloud computing environment 50 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 60 includes hardware and software components. Examples of hardware components include mainframes, in one example IBM System z systems; RISC (Reduced Instruction Set Computer) architecture based servers, in one example IBM Power Systems; IBM System x systems; IBM BladeCenter systems; storage devices; networks and networking components. Examples of software components include network application server software, in one example IBM Web Sphere® application server software; database software, in one example IBM DB2® database software; and streaming software, in one example IBM InfoSphere® Streams stream computing software. IBM, System z, Power Systems, System x, BladeCenter, InfoSphere, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 65 is representative of a cloud manager (or shared pool manager) as described in more detail below. While the cloud manager 65 is shown in FIG. 3 to reside in the management layer 64, cloud manager 65 can span all of the levels shown in FIG. 3, as discussed below.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and operation efficiency management 67, which may be utilized as discussed in more detail below.

Figure 4:
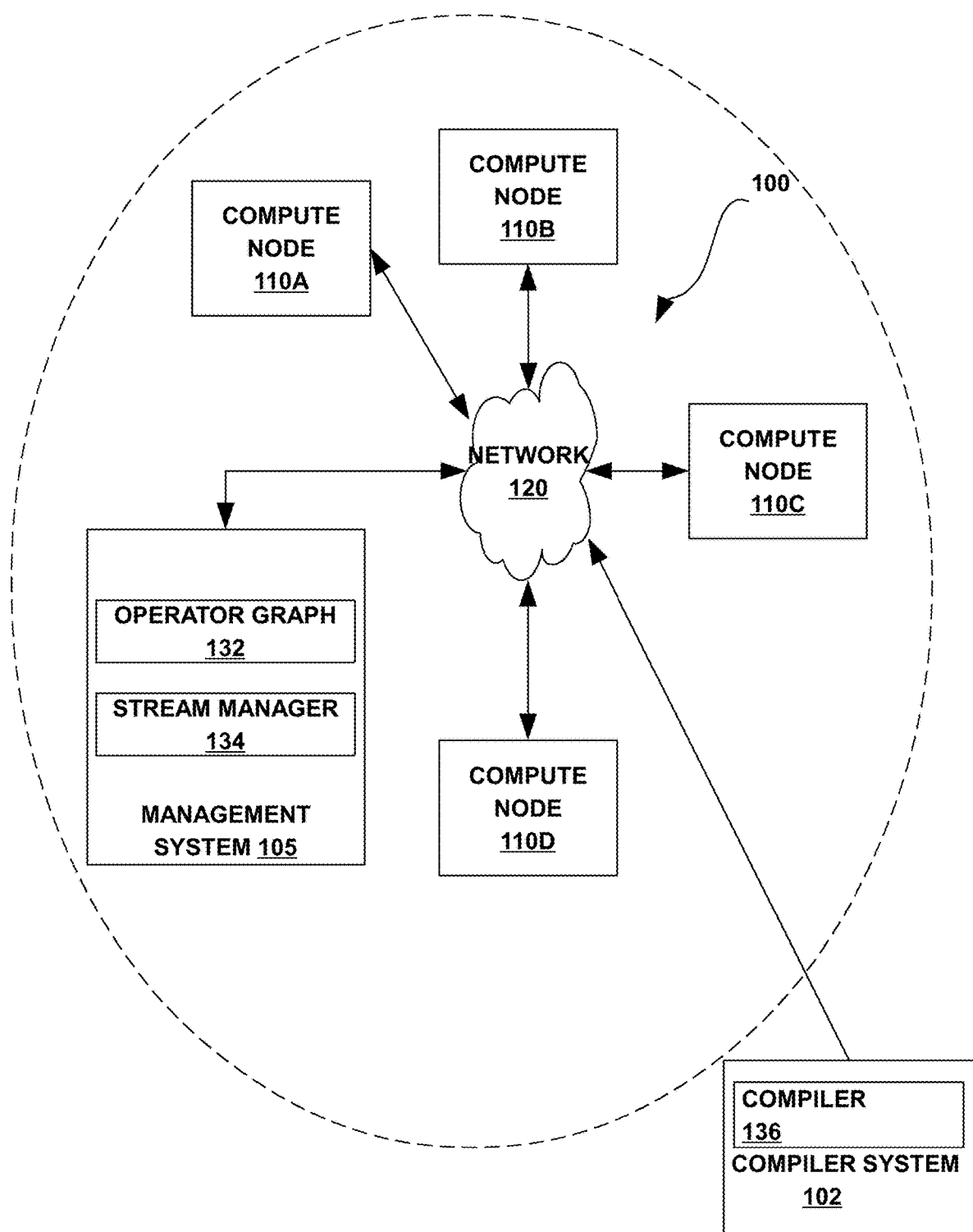
FIG. 4 illustrates an exemplary computing infrastructure to execute a stream computing application according to embodiments.

FIG. 4 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 5:
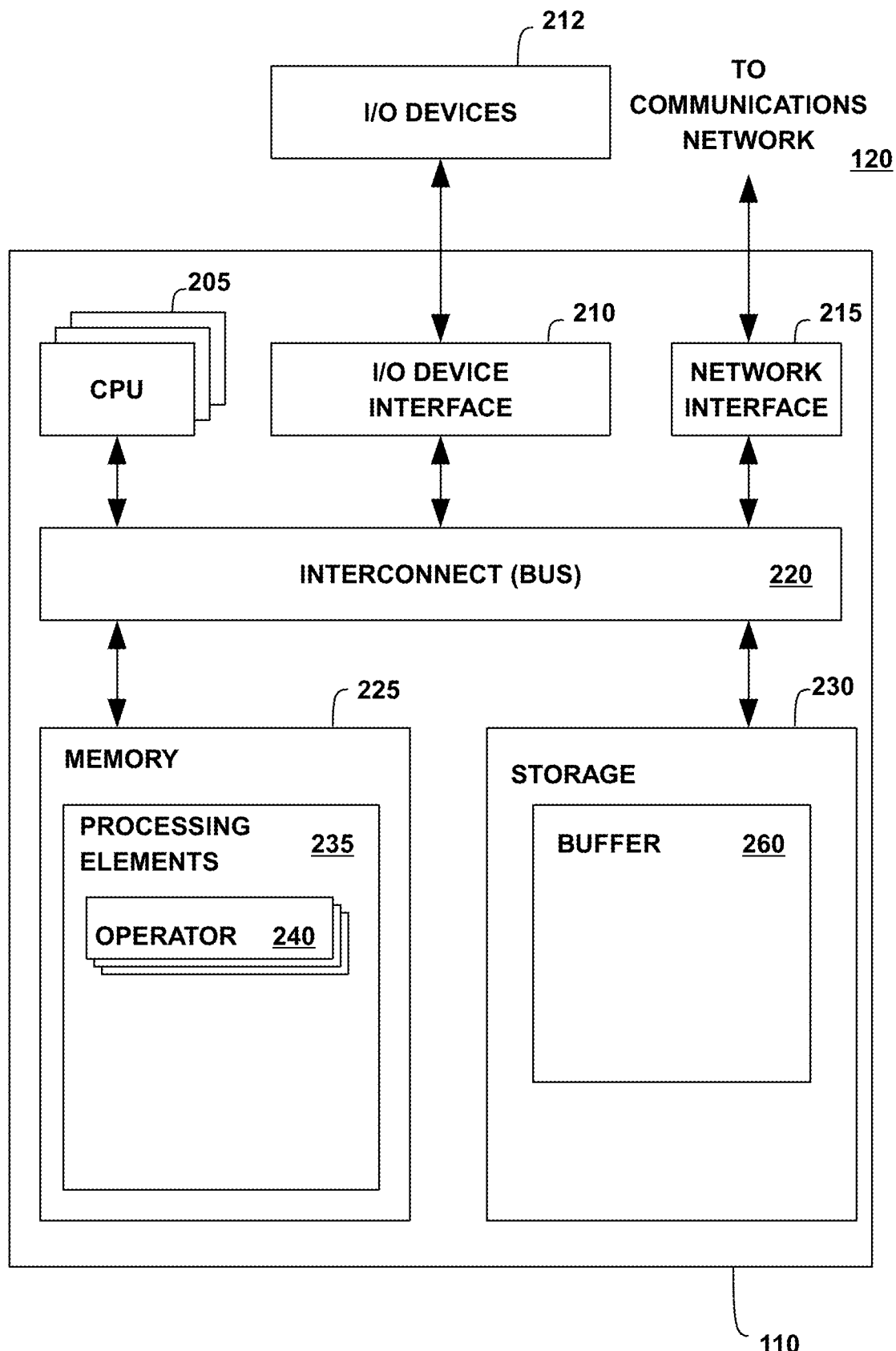
FIG. 5 illustrates a view of a compute node according to embodiments.

FIG. 5 is a more detailed view of a compute node 110, which may be the same as one of the compute nodes 110A-110D of FIG. 4, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems. An operating system may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 6:
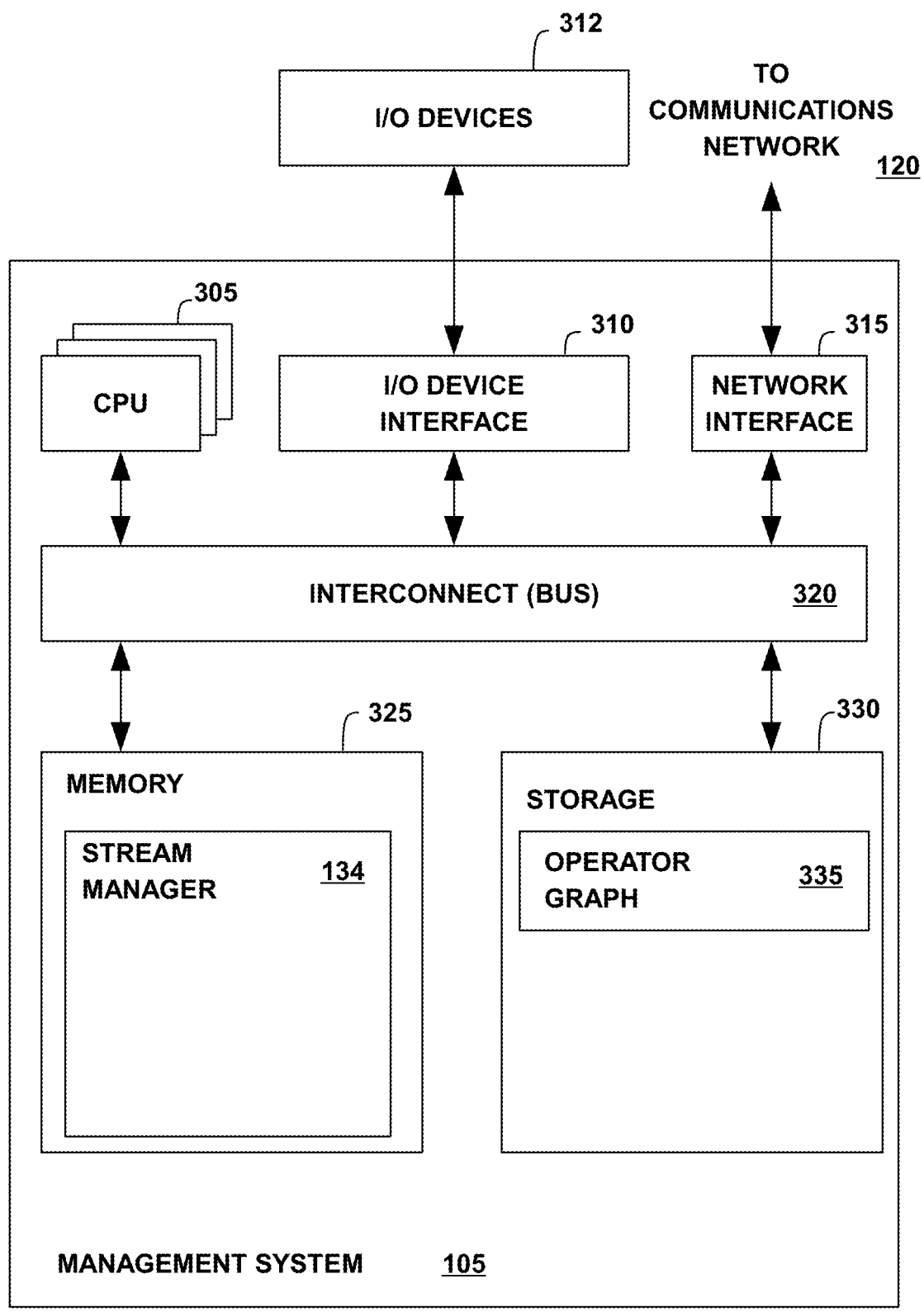
FIG. 6 illustrates a view of a management system according to embodiments.

FIG. 6 is a more detailed view of the management system 105 of FIG. 4 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 5) for processing or stored in memory 325 (e.g., completely in embodiments, partially in embodiments).

The management system 105 may include one or more operating systems. An operating system may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 7:
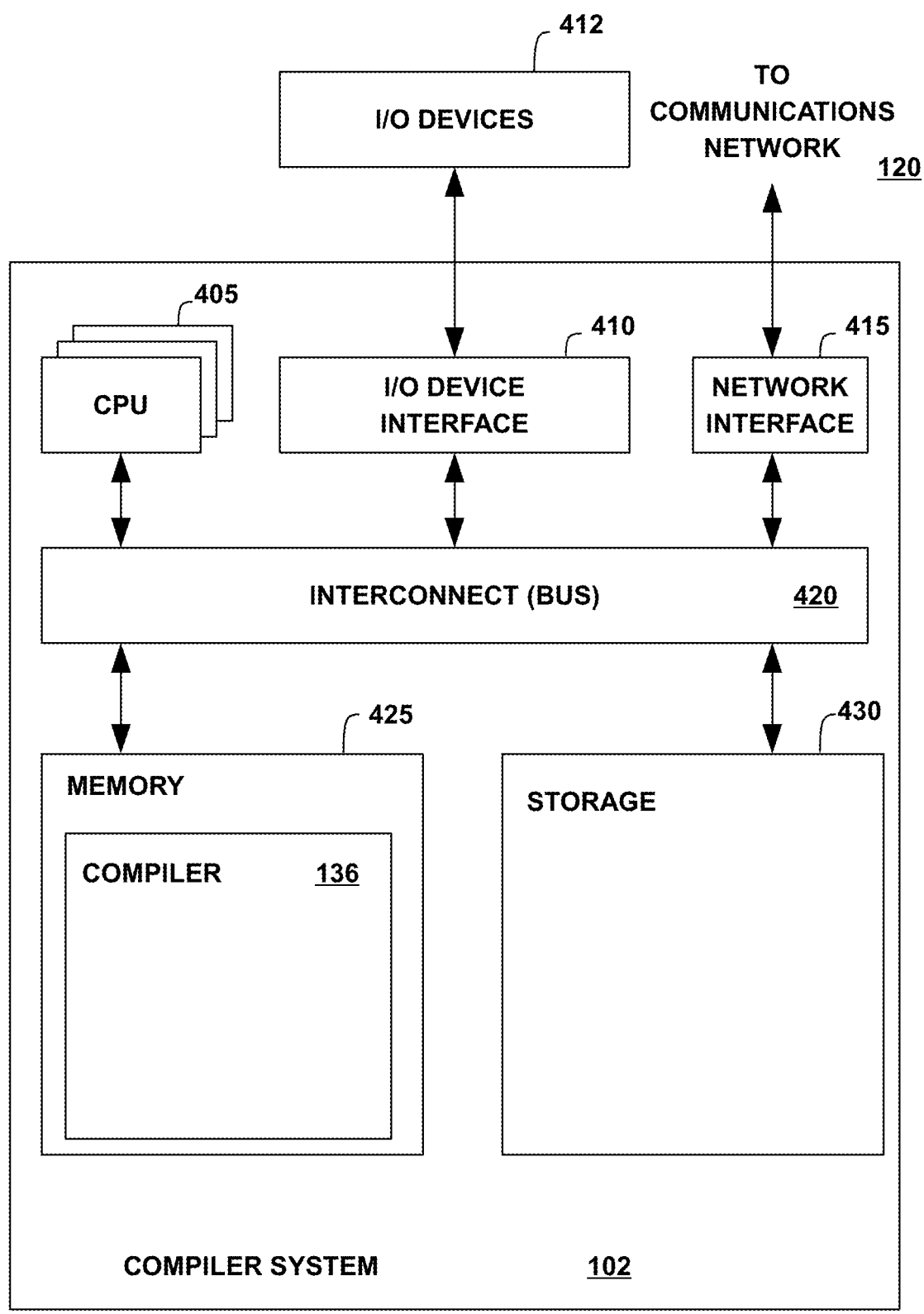
FIG. 7 illustrates a view of a compiler system according to embodiments.

FIG. 7 is a more detailed view of the compiler system 102 of FIG. 4 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems. An operating system may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph (e.g., the operator graph 335 of FIG. 6).

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 8:
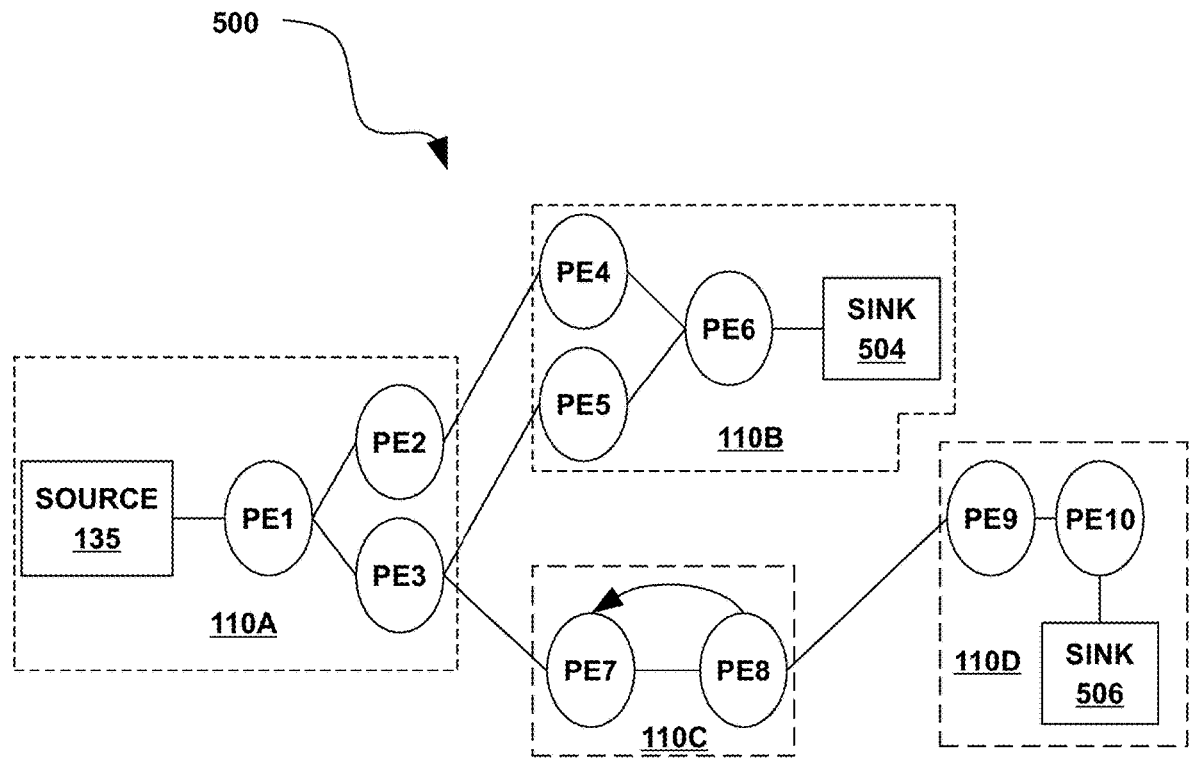
FIG. 8 illustrates an exemplary operator graph for a stream computing application according to embodiments.

FIG. 8 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 8 is abstracted to show connected processing elements PE1-PE10, the operator graph 500 may include data flows between stream operators 240 (FIG. 5) within the same or different processing elements. Typically, processing elements, such as processing element 235 (FIG. 5), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 8 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 5) may be configured to receive or output tuples in various formats, e.g., the processing elements or stream operators could exchange data marked up as XML, documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 4 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 8 illustrates execution paths between processing elements for the sake of clarity.

Figure 9:
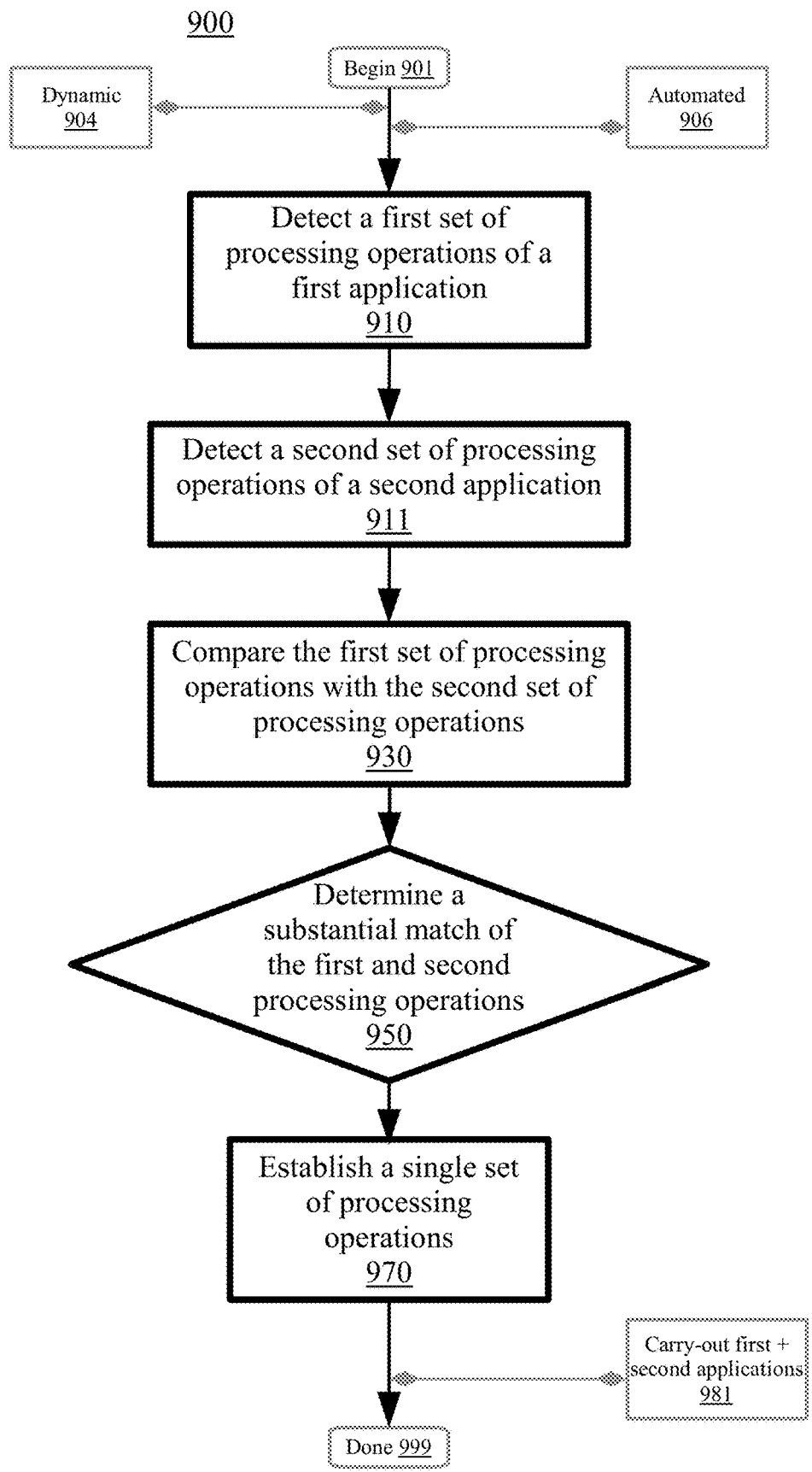
FIG. 9 is a flowchart illustrating a method of run-time operation efficiency management in a shared pool of configurable computing resources, according to embodiments.

FIG. 9 is a flowchart illustrating a method 900 of run-time operation efficiency management in a shared pool of configurable computing resources, according to embodiments. Aspects of the disclosure relate to the recognition that, in some situations, computing applications (e.g., belonging to different tenants) stored on the same host infrastructure may share similar application structures or produce equivalent output data, resulting in structural or operational redundancy. Accordingly, aspects of the disclosure relate to detecting redundancies in the structure or data output of two or more computing applications in a distributed computing environment, and creating a shared application segment to reduce the redundancy between the two or more computing applications. As such, aspects of method 900 relate to determining a substantial match with respect to a first set of processing operations of a first application and a second set of processing operations of a second application in a distributed computing environment, and establishing a single set of processing operations for both the first and second applications in the shared pool of configurable computing resources (e.g., to reduce/eliminate redundancy between the first and second applications). In embodiments, the shared pool of configurable computing resources may include a distributed computing environment. For example, the shared pool of configurable computing resources may include a public cloud environment, a private cloud environment, an on-premises computing cluster, a hybrid cloud environment, or the like. In embodiments, aspects of the disclosure relate to determining the redundancy between the first and second applications at application run-time. Generally, application run-time may refer to the process of initializing and performing the instructions and routines of the first and segment applications by a computer or virtual machine within the shared pool of configurable computing resources. Run-time may include using a loader to perform memory setup, shared library linking, and the initiation of software execution from the entry point of a computer program. The method 900 may begin at block 901.

In embodiments, the detecting of the first set of processing operations of the first application, the detecting of the second set of processing operations of the second application, the comparing, the determining, the establishing, and the other steps described herein may each be executed in a dynamic fashion at block 904. The steps described herein may be executed in a dynamic fashion to streamline run-time operation efficiency management in the shared pool of configurable computing resources. For instance, the detecting of the first set of processing operations of the first application, the detecting of the second set of processing operations of the second application, the comparing, the determining, the establishing, and the other steps described herein may occur in real-time, ongoing, or on-the-fly. As an example, one or more steps described herein may be performed in an ongoing fashion (e.g., substantial matches between a plurality of processing operations may be continuously determined and single sets of processing operations may be established for applications as additional applications are deployed to a distributed computing environment) in order to streamline (e.g., facilitate, promote, enhance) run-time operation efficiency management in the shared pool of configurable computing resources.

In embodiments, the detecting of the first set of processing operations of the first application, the detecting of the second set of processing operations of the second application, the comparing, the determining, the establishing, and the other steps described herein may each be executed in an automated fashion at block 906. The steps described herein may be executed in an automated fashion without user intervention. In embodiments, the detecting of the first set of processing operations of the first application, the detecting of the second set of processing operations of the second application, the comparing, the determining, the establishing, and the other steps described herein may be carried out by an internal run-time operation efficiency management module maintained in a persistent storage device of a local computing device (e.g., network node). In embodiments, the detecting of the first set of processing operations of the first application, the detecting of the second set of processing operations of the second application, the comparing, the determining, the establishing, and the other steps described herein may be carried out by an external run-time operation efficiency management module hosted by a remote computing device or server (e.g., server accessible via subscription, usage-based, or other service model). As such, aspects of run-time operation efficiency management may be performed using automated computing machinery without manual action. Other methods of performing the steps described herein are also possible.

At block 910, a first set of processing operations of a first application may be detected. The detecting may occur in the shared pool of configurable computing resources. Generally, detecting can include sensing, recognizing, discovering, distinguishing, identifying, or otherwise ascertaining the first set of processing operations of the first application. The first set of processing operations may include a collection of one or more steps, transactions, procedures, or other actions performed by a first application to process (e.g., analyze, examine, evaluate, transform) data (e.g., tuples) in the shared pool of configurable computing resources. For instance, the first set of processing operations may include actions executed on data by stream computing operators of a stream computing environment to join, filter, sort, and otherwise manage tuples flowing through an operator graph. In embodiments, the first set of processing operations may be performed by a first application. The first application may include a software program, collection of computing instructions, or other set of computing code configured to perform a specific task or purpose in the shared pool of configurable computing resources. As an example, the first application may include a software program to examine a set of network traffic to monitor for unauthorized access/intrusion attempts. In embodiments, detecting the first set of processing operations of the first application may include monitoring a task manager widget for the shared pool of configurable computing resources to identify that a particular set of processing operations have been initiated by the first application. As an example, a task manager widget may be monitored to detect a first set of processing operations including an ingest operation (e.g., to import a data feed) executed by a natural language processing application. Other methods of detecting the first set of processing operations of the first application in the shared pool of configurable computing resources are also possible.

At block 911, a second set of processing operations of a second application may be detected. The detecting may occur in the shared pool of configurable computing resources. Generally, detecting can include sensing, recognizing, discovering, distinguishing, identifying, or otherwise ascertaining the second set of processing operations of the second application. The second set of processing operations may include a collection of one or more steps, transactions, procedures, or other actions performed by the second application to process (e.g., analyze, examine, evaluate, transform) data (e.g., tuples) in the shared pool of configurable computing resources. For instance, the second set of processing operations may include actions executed on data by stream computing operators of a stream computing environment to ingest, delay, aggregate, split, and otherwise manage tuples flowing through an operator graph. In embodiments, the second set of processing operations may substantially correspond to the first set of processing operations. In embodiments, the second set of processing operations may be performed by a second application. The second application may include a software program, collection of computing instructions, or other set of computing code configured to perform a specific task or purpose in the shared pool of configurable computing resources. In embodiments, the second application may substantially correspond to the first application (e.g., may contain similar aspects, perform similar functions). For instance, the second application may include the same type/arrangement of stream operators as the first application, or different types of stream applications that bring about a similar function or result with respect to processed data. As an example, the second application may include a software program configured to examine a set of network traffic to monitor for financial transactions greater than a threshold currency value (e.g., an application that performs similar operations as the previously mentioned first application that monitors network traffic for unauthorized access attempts). In embodiments, detecting the second set of processing operations of the second application may include analyzing output data traffic from a set of stream computing operators in order to identify that a particular set of processing operations have been executed by the second application. As an example, a data traffic diagnostic module may monitor a set of output data traffic from a set of computing operators and ascertain that a second set of processing operations including a join operation have been performed to combine one or more input data streams into a single output stream. Other methods of detecting the second set of processing operations of the second application in the shared pool of configurable computing resources are also possible.

At block 930, the first set of processing operations of the first application may be compared with the second set of processing operations of the second application. Generally, comparing can include contrasting, analyzing, investigating, correlating, juxtaposing, or otherwise evaluating the first set of processing operations of the first application in parallel with the second set of processing operations of the second application. In embodiments, comparing the first set of processing operations with the second set of processing operations may include examining one or more structural characteristics of the first application with respect to one or more structural characteristics of the second application. For instance, the type, quantity, or arrangement of stream operators utilized by the first and second applications may be compared with one another to ascertain a degree of similarity between the structure of the first and second applications with respect to one another. In embodiments, comparing the first set of processing operations with the second set of processing operations may include evaluating a first set of output data produced by the first application with respect to a second set of output data produced by the second application. For instance, the attributes of tuples created by the first and second applications, respectively, may be compared with respect to one another to evaluate the degree to which the first and second sets of output data overlap, share characteristics, or correspond to one another. In embodiments, comparing the first and second processing operations may include generating a qualitative or quantitative assessment of the degree of similarity between the first and second processing operations. As an example, comparing may include formulating and assigning a similarity score to a group of processing operations to indicate how closely they relate to one another (e.g., a similarity score of 100 may indicate they are identical, while a similarity score of 0 may indicate no distinguishable similarity). As another example, comparing may include compiling a list of identified similarities and differences between the compared sets of processing operations (e.g., for presentation to a user/administrator). Other methods of comparing the first set of processing operations of the first application with the second set of processing applications of the second application are also possible.

At block 950, a substantial match of the first and second processing operations of the first and second applications may be determined. The determining may occur based on comparing the first set of processing operations of the first application with the second set of processing operations of the second application. Generally, determining can include formulating, calculating, resolving, computing, identifying, or otherwise ascertaining the substantial match of the first and second processing operations of the first and second applications. The substantial match may include an association, connection, correlation, or other relationship that indicates similarity between the first set of processing operations and the second set of processing applications. In embodiments, the substantial match may include structural or operational identicalness between the first and second sets of processing operations (e.g., the first and second sets of processing operations make use of the same stream operators or produce the same output data). In embodiments, the substantial match may include structural or operational equivalence between the first and second sets of processing operations (e.g., the first and second sets of processing operations may use different stream operators or produce different data while substantially sharing characteristics). In embodiments, determining the substantial match between the first set of processing operations and the second set of processing operations may include calculating a similarity score for the first and second sets of processing operations with respect to one another, and ascertaining that the similarity score achieves a similarity threshold. The similarity score may include a quantitative indication of the degree of correspondence, overlap, structural or operational closeness, agreement, or correlation between the first and second sets of processing operations (e.g., a similarity score of 100 may indicate that the first and second sets of processing operations are identical, while a similarity score of 0 may indicate no distinguishable similarity). Calculating the similarity score may include examining the type, quantity, arrangement, and usage history of structural elements (e.g., operators, source code) of the first and second sets of processing operations together with attributes of result data (e.g., metadata, intended usage, tuple attributes) to generate a quantitative assessment of the correspondence between the first and second sets of processing operations. As an example, a first set of processing operations including an ingest operation, a filter operation, and a join operation may be assigned a similarity score of 87 with respect to a second set of processing operations including an ingest operation, a filter operation, and an aggregation operation (e.g., the join operation and the aggregation operation may perform substantially the same function). The similarity score of 87 may be compared with respect to a similarity threshold of 80, and it may be determined that the first and second sets of processing operations are associated with a substantial match with respect to one another. Other methods of determining the substantial match of the first and second processing operations of the first and second applications are also possible.

At block 970, a single set of processing operations for both the first and second applications may be established. The establishing may occur in the shared pool of configurable computing resources. Generally, establishing can include instantiating, creating, setting-up, organizing, introducing, providing, assembling, arranging, generating, or otherwise structuring the single set of processing operations for both the first and second applications in the shared pool of configurable computing resources. The single set of processing operations may include an individual collection of one or more steps, transactions, procedures, or other actions to process (e.g., analyze, examine, evaluate, transform) data (e.g., tuples) in the shared pool of configurable computing resources. In embodiments, the single set of processing operations may be configured to perform one or more functions that substantially correspond to (e.g., have the same effect on data, process data in the same way, perform an equivalent function) the first set of processing operations and the second set of processing operations such that the first and second sets of processing operations may be replaced by the single set of processing operations. In embodiments, establishing the single set of processing operations may include introducing a shared application segment in the shared pool of configurable computing resources to take the place of both the first set of processing operations of the first application and the second set of processing operations of the second application. For instance, one or more stream operators may be structured in an operator graph of the shared pool of configurable computing resources to supersede (e.g., replace, override) both the first set of processing operations and the second set of processing operations. As an example, an operator graph of a shared pool of configurable computing resources may include a first set of processing operations including an ingest operation to ingest a social media data feed for a first application, as well as a second set of processing operations including an ingest operation to ingest the same social media data feed for a second application. Accordingly, establishing the single set of processing operations may include creating a shared application segment to replace the first and second sets of processing operations that includes a single ingest operation to ingest the social media data feed for use by both the first application and the second application. Other methods of establishing the single set of processing operations for both the first and second applications in the shared pool of configurable computing resources are also possible.

In embodiments, both the first and second applications may be carried-out at block 981. The carrying-out may occur using the single set of processing operations. Generally, carrying-out can include implementing, instantiating, initiating, utilizing, running, or otherwise executing both the first and second applications using the single set of processing operations. In embodiments, carrying-out both the first and second applications may include running the first and second applications using the single set of processing operations. For instance, carrying-out may include processing a set of data (e.g., tuples) or performing an operation (e.g., join operation, sort operation, filter operation) for the first application and the second application using the single set of processing operations (e.g., and not using the first set of processing operations or the second set of processing operations). As an example, consider that a single set of processing operations including a join operation to combine data from two separate streams is established in the shared pool of configurable computing resources. Accordingly, carrying-out the first and second applications may include using the single set of processing operations including the join operation to combine data from the two separate data streams, and subsequently route the data to subsequent operators of both the first and second applications, respectively (e.g., for independent processing). Other methods of carrying-out the first and second applications using the single set of processing operations are also possible.

Consider the following example. A first set of processing operations including an ingesting operation to ingest a stream of social media data, a filtering operation to filter the stream of social media data for portions of data that include reference to a stock symbol of "ACME," and a sorting operation to sort the filtered portions of data by date may be detected in a shared pool of configurable computing resources. In embodiments, a second set of processing operations including an ingesting operation to ingest the same stream of social media data, a sorting operation to filter the stream of social media by date, and a filtering operation to filter the stream of social media data for portions of data that include reference to a stock symbol of "ACME" may be detected in the shared pool of configurable computing resources. As described herein, the first and second sets of processing operations may be compared with one another to ascertain a degree of similarity between the first set of processing operations and the second set of processing operations. Comparing the first and second sets of processing operations may include examining both structural characteristics as well as output data of the first set of processing operations and the second set of processing operations with respect to one another. In embodiments, based on the comparison, it may be ascertained that both the first and second sets of processing operations share the same operators (e.g., with the only difference being the arrangement order of the operations) and produce equivalent output data (e.g., a subset of social media data that references an "ACME" stock symbol that is organized by date). Accordingly, as described herein, a substantial match of the first and second sets of processing operations may be determined based on the structural and operational similarity between the first and second sets of processing operations. In response to determining the substantial match, a single set of processing operations (e.g., to replace the first and second sets of processing operations) may be established. For instance, a single set of processing operations including an ingesting operation to ingest a stream of social media data, a filtering operation to filter the stream of social media data for portions of data that include reference to a stock symbol of "ACME," and a sorting operation to sort the filtered portions of data by date may be introduced as a shared application segment in the shared pool of configurable computing resources (e.g., to supersede both the first and second sets of processing operations). As such, both a first and second application may make use of the single set of processing applications (e.g., facilitating resource usage efficiency).

Method 900 concludes at block 999. Aspects of method 900 may provide performance or efficiency benefits related to run-time operation efficiency management in a shared pool of configurable computing resources. Aspects may save resources such as bandwidth, processing, or memory. As an example, replacing both the first and second sets of processing operations with the single set of processing operations may reduce the processing resources, network bandwidth, and memory resources used by host computing infrastructure. Altogether, performance or efficiency benefits with respect to operation efficiency in a distributed batch data processing environment may occur (e.g., speed, flexibility, load balancing, responsiveness, high availability, resource usage, productivity).

Figure 10:
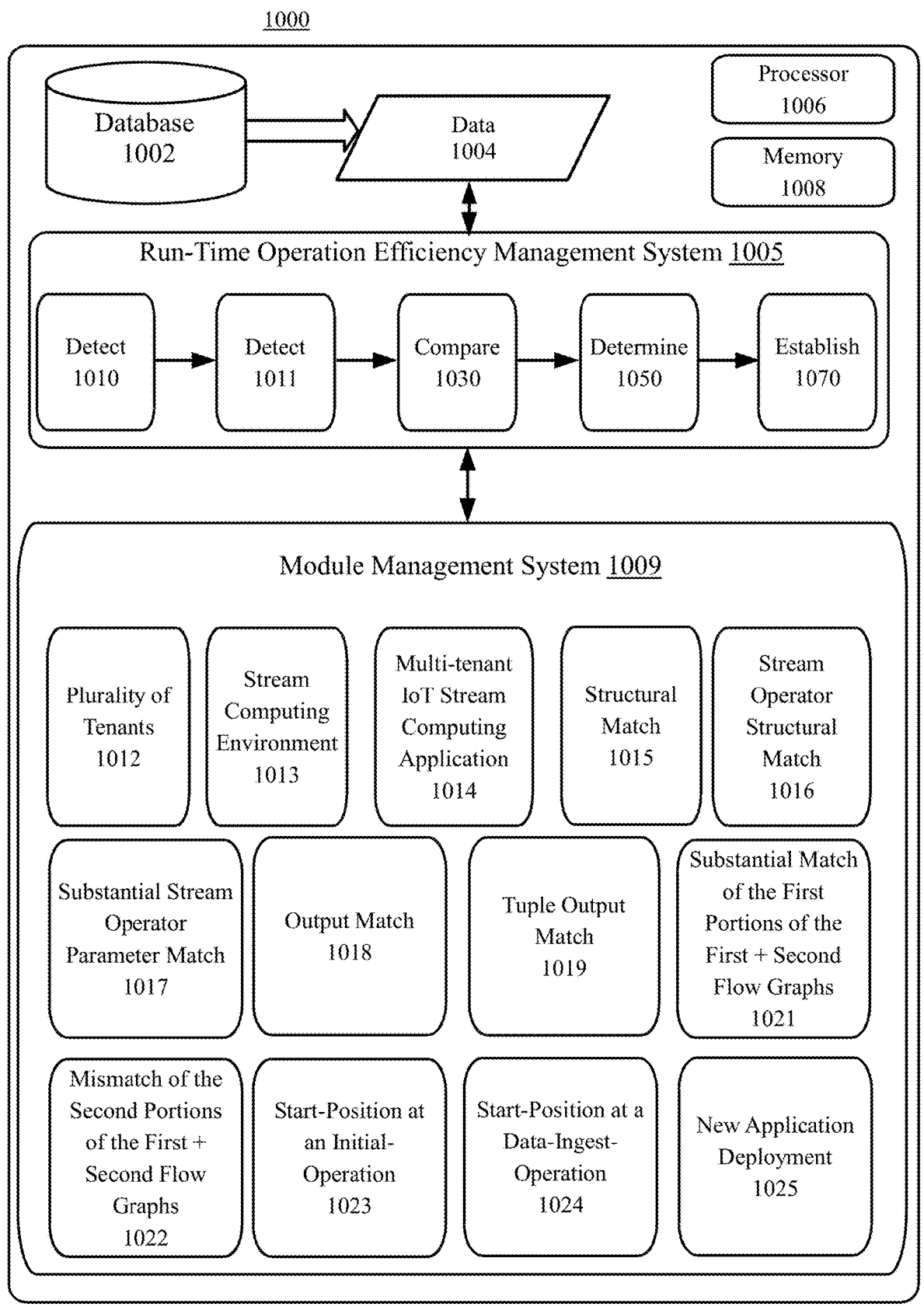
FIG. 10 shows an example system of run-time operation efficiency management in a shared pool of configurable computing resources, according to embodiments.

FIG. 10 shows an example system 1000 of run-time operation efficiency management in a shared pool of configurable computing resources, according to embodiments. The example system 1000 may include a processor 1006 and a memory 1008 to facilitate implementation of run-time operation efficiency management. The example system 1000 may include a database 1002 configured to maintain data used for run-time operation efficiency management. In embodiments, the example system 1000 may include a run-time operation efficiency management system 1005. The run-time operation efficiency management system 1005 may be communicatively connected to the database 1002, and be configured to receive data (e.g., tuples, data blocks) 1004 related to run-time operation efficiency management. The run-time operation efficiency management system 1005 may include a detecting module 1010 to detect a first set of processing operations, a detecting module 1011 to detect a second set of processing operations, a comparing module 1030 to compare the first and second set of processing operations, a determining module 1050 to determine a substantial match, and an establishing module 1070 to establish a single set of processing operations. The run-time operation efficiency management system 1005 may be communicatively connected with a module management system 1009 that includes one or more modules or sub-modules for implementing aspects of run-time operation efficiency management.

In embodiments, the shared pool of configurable computing resources may include a plurality of tenants at module 1012. The plurality of tenants may include both a first tenant and a second tenant. Aspects of the disclosure relate to the recognition that, in some embodiments, a plurality of tenants may make use of the same shared pool of configurable computing resources (e.g., be allocated to the same host hardware). Accordingly, aspects of the disclosure relate to establishing a single set of processing operations to simultaneously service applications of multiple tenants of the shared pool of configurable computing resources. In embodiments, it may be detected that the first tenant corresponds to the first application. Generally, detecting can include sensing, recognizing, discovering, distinguishing, identifying, or otherwise ascertaining that the first tenant corresponds to the first application. The first tenant may include a client, customer, patron, company, organization, entity or other group of one or more users who share common access privileges to make use of the shared pool of configurable computing resources to facilitate operation of the first application. In embodiments, detecting that the first tenant corresponds to the first application may include analyzing metadata for the first application and sensing that the first application is owned/licensed by the first tenant and maintained on the shared pool of configurable computing resources. In embodiments, it may be detected that the second tenant corresponds to the second application. The second tenant may include a client, customer, patron, company, organization, entity or other group of one or more users who share common access privileges to make use of the shared pool of configurable computing resources to facilitate operation of the second application. In embodiments, detecting that the second tenant corresponds to the second application may include searching a tenant database for the shared pool of configuring resources, and ascertaining that the second tenant is registered as an authorized user with respect to the second application. In embodiments, the single set of processing operations for both the first and second applications of both the first and second tenants may be established. The establishing may occur in the shared pool of configurable computing resources. Generally, establishing can include instantiating, creating, setting-up, organizing, introducing, providing, assembling, arranging, generating, or otherwise structuring the single set of processing operations for both the first and second applications in the shared pool of configurable computing resources. As described herein, establishing the single set of processing operations may include introducing a shared application in the shared pool of configurable computing resources to take the place of both the first set of processing operations of the first application and the second set of processing operations of the second application. As such, both the first and second tenants may make use of the same single set of processing operations to facilitate operation of the first and second applications, respectively. Other methods of managing a multi-tenant shared pool of configurable computing resources are also possible.

In embodiments, the shared pool of configurable computing resources may include a stream computing environment at module 1013. The stream computing environment may include a collection of one or more stream operators (e.g. processing elements) configured to perform operations (logic-based analysis, attribute modification) on data (e.g., tuples) as part of a stream computing application in real-time. In embodiments, a first set of stream computing processing operations of a first stream computing application may be detected (e.g., sensed, recognized, discovered, distinguished, identified, ascertained). The first set of stream computing processing operations may include one or more processes, procedures, or actions performed by stream operators of the stream computing environment in relation to the first application. As examples, the first set of stream computing processing operations may include join operations, filter operations, ingest operations, sort operations, or the like. The detecting may occur in the shared pool of configurable computing resources. In embodiments, detecting the first set of stream computing processing operations may include monitoring a task manager widget for the stream computing environment to identify that a particular set of stream processing operations have been initiated by the first application in the stream computing environment. In embodiments, a second set of stream computing processing operations of a second stream computing application may be detected. The detecting may occur in the shared pool of configurable computing resources. The second set of stream computing processing operations may include one or more processes, procedures, or actions performed by stream operators of the stream computing environment in relation to the second application (e.g., delay operations, aggregation operations, functor operations). In embodiments, detecting the second set of stream computing processing operations may include analyzing output tuples of the stream computing environment and identifying that the second set of stream computing processing operations have been performed on the tuples of the stream computing environment.

The first set of stream computing processing operations may be compared (e.g., contrasted, analyzed, investigated, correlated, juxtaposed, evaluated) with the second set of stream computing processing operations. In embodiments, comparing may include examining the structural composition of an operator graph of the first application with respect to the structural composition of an operator graph of the second application. The substantial match may be determined (e.g., formulated, calculated, resolved, computed, identified, ascertained) based on comparing the first set of stream computing processing operations with the second set of stream computing processing operations. In embodiments, determining the substantial match may include ascertaining that one or more structural characteristics (e.g., stream operator type, order, arrangement) or tuple attributes of output tuples of the first and second sets of stream computing processing operations achieve a similarity threshold with respect to one another. For instance, both the first and second operator graphs may include a sort operator configured to sort tuples by date as the 4th operator from the start of the operator graph. In embodiments, a single set of stream computing processing operations may be established (e.g., instantiated, created, set-up, organized, introduced, provided, assembled, arranged, generated, structured). The establishing may occur in the shared pool of configurable computing resources. Establishing the single set of stream computing processing applications may include generating a shared operator graph segment to supersede the first and second sets of stream computing processing operations (e.g., sort operator that may be used by both the first and second applications). Other methods of run-time operation efficiency management in a stream computing environment are also possible.

In embodiments, a multi-tenant Internet of Things (IoT) stream computing application may occur at module 1014. The shared pool of configurable computing resources may include a plurality of tenants including both a first tenant and a second tenant. The multi-tenant IoT stream computing application may include a stream computing application configured to process data captured from an IoT environment. The IoT environment may include a network of interconnected sensors, devices, vehicles, buildings, and other items to facilitate data collection, communication, and connectivity. As an example, the multi-tenant IoT stream computing application may include a collection of stream operators configured to ingest and analyze traffic data for a metropolitan area (e.g., as captured by IoT devices including cameras, satellites, vehicle navigation systems). In embodiments, it may be detected (e.g., sensed, recognized, discovered, distinguished, identified, ascertained) that the first tenant corresponds to the first set of stream computing processing operations of a first IoT stream computing application, and that the second tenant corresponds to the second set of stream computing processing operations of a second IoT stream computing application. In embodiments, detecting may include searching a tenant database for the shared pool of configuring resources, and ascertaining that the first tenant is registered as an authorized user with respect to a first IoT stream computing application and that the second tenant is registered as an authorized user with respect to a second IoT stream computing application. As an example, the first tenant may be associated with a first IoT stream computing application configured to compute the average commute time of a driver based on ingested traffic data, and the second tenant may be associated with a second IoT stream computing application configured to identify the most common areas of traffic congestion based on the ingested traffic data. In embodiments, the single set of processing operations for both the first and second IoT stream computing applications of both the first and second tenants may be established (e.g., instantiated, created, set-up, organized, introduced, provided, assembled, arranged, generated, structured). The establishing may occur in the shared pool of configurable computing resources. Establishing the single set of processing operations for both the first and second IoT stream computing applications may include creating a shared operator graph segment to replace the first and second sets of stream computing processing operations of the first and second IoT stream computing applications. As an example, with respect to the previous example, establishing the single set of processing operations may include structuring a shared ingest operator for both the first and second IoT stream computing applications such that traffic data for the metropolitan area may be imported once (e.g., rather than separately for each IoT streaming application). Other methods of managing run-time operation efficiency management in a multi-tenant IoT stream computing environment are also possible. In addition, other environments are possible such as a (multi-tenant) data science stream computing environment, a (multi-tenant) social media stream computing environment, or the like.

In embodiments, a structural match may occur at module 1015. A first structure of the first set of processing operations of the first application may be compared with a second structure of the second set of processing operations of the second application. Generally, comparing can include contrasting, analyzing, investigating, correlating, juxtaposing, or otherwise evaluating the first structure of the first set of processing operations of the first application with respect to the second structure of the second set of processing operations of the second application. The first and second structures may include characteristics, traits, or attributes that indicate the arrangement, composition, framework, make-up, format, syntax, design, or infrastructure of the first and second sets of processing operations, respectively. As an example, the first and second structures may include the order or sequence in which particular tasks of the first and second sets of processing operations are performed. In embodiments, comparing may include examining the first structure of the first set of processing operations with respect to the second structure of the second set of processing operations to ascertain the similarity between the first and second structures (e.g., comparing task flow diagrams for each application). In embodiments, a structural match of the first and second structures of the first and second processing operations of the first and second applications may be determined. The determining may occur based on comparing the first structure of the first set of processing operations of the first application with the second structure of the second set of processing operations of the second application. The structural match may include an association, connection, correlation, or other relationship that indicates similarity, equivalence, or identicalness between the first structure and the second structure. As an example, determining the structural match may include ascertaining that both the first and second sets of processing operations perform a formatting operation to structure data in a JPEG format followed by an encryption operation that uses a cryptographic hash function on sets of data. In embodiments, a single structure of the single set of processing operations may be established for both the first and second applications. The establishing may occur in the shared pool of configurable computing resources. The single structure may include a unified or consolidated framework or arrangement of code components, processing elements, or other software modules configured to perform functions equivalent to both the first and second sets of processing operations. Establishing the single structure of the single set of stream computing processing applications may include generating a shared application segment to supersede the first and second sets of processing operations in the shared pool of configurable computing resources. Other methods of run-time operation efficiency management in a shared pool of configurable computing resources are also possible.

In embodiments, a stream operator structural match may occur at module 1016. A first stream operator structure of the first set of stream computing processing operations of the first stream computing application may be compared with a second stream operator structure of the second set of stream computing processing operations of the second stream computing application. Generally, comparing can include contrasting, analyzing, investigating, correlating, juxtaposing, or otherwise evaluating the first stream operator structure with respect to the second stream operator structure. The first and second stream operator structures may include characteristics, traits, or attributes that indicate the arrangement, composition, framework, make-up, format, syntax, design, or infrastructure of the first and second sets of stream computing processing operations, respectively. As examples, the first and second stream operator structures may include the type, sequence, and configuration of stream operators included in the first and second stream computing applications, respectively. In embodiments, comparing may include contrasting a first operator graph for the first stream computing application with respect to a second operator graph for the second stream computing application to identify the structural similarities and differences between the first and second stream computing applications. In embodiments, a stream operator structural match of the first and second stream operator structures of the first and second stream computing processing operations of the first and second stream computing applications may be determined. The determining may occur based on comparing the first stream operator structure of the first set of stream computing processing operations of the first stream computing application with the second stream operator structure of the second set of stream computing processing operations of the second stream computing application. The stream operator structural match may include an association, connection, correlation, or other relationship that indicates similarity, equivalence, or identicalness between the first stream operator structure and the second stream operator structure. As an example, determining the stream operator structural match may include ascertaining that both the first operator graph for the first stream computing application and the second operator graph for the second stream computing application include a delay operator followed by an aggregate operator and a sort operator. In embodiments, a single stream operator structure of the single set of stream computing processing operations may be established for both the first and second stream computing applications. The establishing may occur in the shared pool of configurable computing resources. The single stream operator structure may include a collection of stream operators, compounds (e.g., fused stream operators), or other processing elements configured to perform functions equivalent to both the first and second sets of stream computing processing operations. Establishing the single stream operator structure may include generating a shared operator graph segment to replace the first and second sets of stream computing processing operations in the shared pool of configurable computing resources. Other methods of managing run-time operation efficiency management in a stream computing environment are also possible.

In embodiments, a substantial stream operator parameter match may occur at module 1017. A first set of stream operator parameters of the first set of stream computing processing operations of the first stream computing application may be compared with a second set of stream operator parameters of the second set of stream computing processing operations of the second stream computing application. Generally, comparing can include contrasting, analyzing, investigating, correlating, juxtaposing, or otherwise evaluating the first set of stream operator parameters with the second set of stream operator parameters. The first and second sets of stream operator parameters may include values that define a configuration, setting, behavior, of function of the first and second stream computing processing operations, respectively. As an example, the first and second sets of stream operator parameters may include filter parameters for one or more filter operators that specify particular tuples that should be removed from a stream of tuples (e.g., remove all tuples greater than 1000 bytes, remove tuples that do not include a particular character string). In embodiments, comparing may include evaluating the magnitude of the first set of stream operator parameters with the second set of stream operator parameters. In embodiments, a substantial stream operator parameter match of the first and second sets of stream operator parameters of the first and second stream computing processing operations of the first and second stream computing applications may be determined. The determining may occur based on comparing the first set of stream operator parameters of the first set of stream computing processing operations of the first stream computing application with the second set of stream operator parameters of the second set of stream computing processing operations of the second stream computing application. The substantial stream operator parameter match may include a correspondence or agreement between the first set of stream operator parameters and the second set of stream operator parameters within a parameter tolerance threshold. As an example, determining the substantial stream operator parameter match may include ascertaining that a first delay parameter (e.g., length of time to delay tuples before relaying them to a next stream operator) of "30 seconds" for a first set of stream computing processing operations and a second delay parameter of "41 seconds" for a second set of stream computing processing operations achieve a parameter tolerance threshold of "difference of less than 15 seconds." In embodiments, a single set of stream operator parameters of the single set of stream computing processing operations may be established for both the first and second stream computing applications. The establishing may occur in the shared pool of configurable computing resources. Establishing the single set of stream operator parameters of the single set of stream computing processing operations may include assigning, defining, specifying, designating, or otherwise configuring one or more stream operator parameters of the single set of stream computing processing operations to have the same parameter values as corresponding stream operators of the first and second sets of stream computing processing operations. Other methods of run-time operation efficiency management in a stream computing environment are also possible.

In embodiments, an output match may occur at module 1018. A first set of output data of the first set of processing operations of the first application may be compared with a second set of output data of the second set of processing operations of the second application. The first and second sets of output data may include data produced as the result or outcome of one or more processing operations performed on a set of input data. As an example, the first and second sets of output data may include data that has been modified, analyzed, processed, or transformed as the result of a processing operation. In embodiments, comparing the first and second sets of output data may include examining the size (e.g., 1 megabyte, 600 kilobytes), content (e.g., topic, subject matter), formatting (e.g., encoding), security protocol (e.g., encryption level), resource requirements (e.g., memory footprint, processing resources), metadata (e.g., nature of operations that have been performed on the data), and other aspects of the first and second sets of output data with respect to each other. In embodiments, an output match of the first and second sets of output data of the first and second processing operations of the first and second applications may be determined. The determining may occur based on comparing the first set of output data of the first set of processing operations of the first application with the second set of output data of the second set of processing operations of the second application. The output match may include an association, connection, correlation, or other relationship that indicates similarity, equivalence, or identicalness between the first and second sets of output data. Determining the output match may include using a content analysis technique to ascertain that the first and second sets of output data include substantially equivalent information. As an example, consider a first set of input data (e.g., text corpus) that is analyzed by a proper-noun tagger and subsequently analyzed by a verb-tagger to generate a first set of output data having proper nouns and verbs tagged. A second set of input data that is identical to the first set of input data may be analyzed by a single natural language processing technique configured to produce a second set of output data having both proper-nouns and verbs tagged. Accordingly, the first and second sets of output data may be analyzed and determined to be associated with an output match (e.g., the same natural language processing operations were performed on identical data in a different number of steps, producing an equivalent result). In embodiments, a single set of output data may be produced. Generally, producing can include creating, providing, assembling, building, or otherwise generating the single set of output data. The producing may be performed by the single set of processing operations for both the first and second applications in the shared pool of configurable computing resources. The single set of output data may include a consolidated or unified set of output data that may be used by both the first and second applications. In embodiments, producing the single set of output data may include consolidating the first and second sets of output data into the single set of output data, and transmitting it to the first and second applications in place of the first and second sets of output data. As an example, with reference to the previous example, producing the single set of output data may include creating a set of data in which both verbs and proper nouns are tagged. Other methods of managing an output match with respect to a first set of output data and a second set of output data are also possible.

In embodiments, a tuple output match may occur at module 1019. A first set of output tuples of the first set of stream computing processing operations of the first stream computing application may be compared with a second set of output tuples of the second set of stream computing processing operations of the second stream computing application. The first and second sets of output tuples may include tuples produced or generated by stream operators of the stream computing environment. For instance, the first and second sets of output tuples may include input tuples that have been processed, transformed, modified, analyzed, or otherwise operated on by one or more stream operators. In embodiments, comparing the first and second sets of output tuples may include examining the tuple type (e.g., function, content), tuple size (e.g., memory footprint), tuple format (e.g., data structure), or tuple attributes (e.g., property, feature, trait, parameter, or other aspect that defines, describes, or characterizes a tuple) of the first and second sets of output tuples with respect to one another. In embodiments, a tuple output match of the first and second sets of output tuples of the first and second stream computing processing operations of the first and second stream computing applications may be determined. The determining may occur based on comparing the first set of output tuples of the first set of stream computing processing operations of the first stream computing application with the second set of output tuples of the second set of stream computing processing operations of the second stream computing application. The tuple output match may include an association, connection, correlation, or other relationship that indicates similarity, equivalence, or identicalness between the first and second sets of output tuples. For instance, determining the tuple output match may include computing that a number of shared tuple attributes of the first and second sets of output tuples exceed a shared tuple attribute threshold. As an example, it may be determined that file tuple attributes of "File Size—800 kilobytes," "Creation Date: Nov. 13, 2016 4:18 PM," and "Completion Level: 81%" are shared between both the first and second sets of output tuples, and satisfy a shard tuple attribute threshold of "3 attributes or more." In embodiments, a single set of output tuples may be produced. The producing may be performed by the single set of stream computing processing operations for both the first and second stream computing applications in the shared pool of configurable computing resources. Generally, producing can include creating, providing, assembling, building, or otherwise generating the single set of output tuples. The producing may be performed by the single set of stream computing processing operations for both the first and second stream computing applications in the shared pool of configurable computing resources. The single set of output data may include a combined, fused, or consolidated set of output tuples that may be used by both the first and second applications. In embodiments, producing the single set of output tuples may include combining the first set of output tuples and the second set of output tuples into a single tuple stream, and subsequently filtering the single tuple stream to remove duplicate tuples. As described herein, the single set of output tuples may be routed to both the first and second applications in place of the first and second sets of output tuples. Other methods of managing a tuple output match with respect to a first set of output tuples and the second set of output tuples are also possible.

In embodiments, a substantial match of the first portions of the first and second flow graphs may occur at module 1021. A first portion of a first flow graph may be analyzed. Generally, analyzing can include evaluating, resolving, parsing, querying, categorizing, investigating, or otherwise examining the first portion of the first flow graph. The first flow graph may include a representation of the structure, composition, or arrangement of the first set of stream computing processing operations (e.g., stream computing operators) as well as the path traversed by data (tuples) processed by the first application. The first portion of the first flow graph may include a segment, piece, section, or part of the first flow graph (e.g., beginning, middle, or end of the first flow graph). The analyzing may occur with respect to a first subset of the first set of stream computing processing operations of the first stream computing application. The first subset of the first set of stream computing processing operations may include a collection, group, or batch of stream computing processing operations included in the first set of stream computing processing operations. In embodiments, the first subset of the first set of stream computing processing operations may include those stream computing processing operations included in the first portion of the first flow graph. In embodiments, analyzing the first portion of the first flow graph may include utilizing a stream computing analysis module to crawl through the first portion of the first flow graph and log (e.g., record, capture, collect) a first set of structural composition data (e.g., information characterizing the number, type, and configuration of processing operations) of the first portion of the first flow graph.

In embodiments, a first portion of a second flow graph may be analyzed. The second flow graph may include a representation of the structure, composition, or arrangement of the second set of stream computing processing operations (e.g., stream computing operators) as well as the path traversed by data (tuples) processed by the second application. The first portion of the second flow graph may include a segment, piece, section, or part of the second flow graph (e.g., beginning, middle, or end of the first flow graph). The analyzing may occur with respect to a first subset of the second set of stream computing processing operations of the second stream computing application. The first subset of the second set of stream computing processing operations may include a collection, group, or batch of stream computing processing operations included in the second set of stream computing processing operations. In embodiments, the first subset of the second set of stream computing processing operations may include those stream computing processing operations included in the first portion of the second flow graph. In embodiments, analyzing the first portion of the second flow graph may include utilizing a stream computing analysis module to crawl through the first portion of the second flow graph and log (e.g., record, capture, collect) a second set of structural composition data (e.g., information characterizing the number, type, and configuration of processing operations) of the first portion of the second flow graph.

The first portion of the first flow graph may be compared with the first portion of the second flow graph. Generally, comparing can include contrasting, analyzing, investigating, correlating, juxtaposing, or otherwise evaluating the first portion of the first flow graph in parallel with the first portion of the second flow graph. In embodiments, comparing may include examining the first set of structural composition data for the first portion of the first flow graph with respect to the second set of structural composition data for the first portion of the second flow graph. A substantial match of the first portions of the first and second flow graphs may be determined. The determining may occur based on comparing the first portion of the first flow graph with the first portion of the second flow graph. Generally, determining can include formulating, calculating, resolving, computing, identifying, or otherwise ascertaining the substantial match of the first and second processing operations of the first and second applications. The substantial match may include an association, connection, correlation, or other relationship that indicates similarity between the first portion of the first flow graph and the first portion of the second flow graph. As described herein, the substantial match may include a structural (e.g., type, number, arrangement of processing operations) or operational (e.g., effect/result on output data) similarity, equivalence, or identicalness between the first portions of the first and second flow graphs. As an example, determining the substantial match may include determining that the first portions of both the first and second flow graphs include the same type of stream operators arranged in a different order. In embodiments, establishment of the single set of stream computing processing operations for both the first and second stream computing applications may be initiated. The initiating may occur in response to determining the substantial match of the first portions of the first and second flow graphs. Generally, initiating can include starting, beginning, instantiating, launching, or commencing establishment of the single set of stream computing processing operations. Establishing the single set of stream computing processing applications may include generating a shared operator graph segment to replace the first and second sets of stream computing processing operations in the shared pool of configurable computing resources. Other methods run-time operation efficiency management based on analysis of portions of flow graphs are also possible.

In embodiments, a mismatch of the second portions of the first and second flow graphs may occur at module 1022. Aspects of the disclosure, in embodiments, relate to repeating/iterating performance analyzing, comparing, determining, and initiating operations for portions of a flow graph until a mismatch (e.g., difference) is detected between the first and second flow graphs. In embodiments, a second portion of the first flow graph may be analyzed. The second portion of the first flow graph may include a segment, piece, section, or part of the first flow graph (e.g., beginning, middle, or end of the first flow graph). The second portion of the first flow graph may be different from (e.g., mutually exclusive, not overlap with) the first portion of the first flow graph. The analyzing may occur with respect to a second subset of the first set of stream computing processing operations of the first stream computing application. The second subset of the first set of stream computing processing operations may include a collection, group, or batch of stream computing processing operations included in the first set of stream computing processing operations. In embodiments, the second subset of the first set of stream computing processing operations may include those stream computing processing operations included in the second portion of the first flow graph. In embodiments, analyzing the second portion of the first flow graph may include utilizing a stream computing analysis module to crawl through the second portion of the first flow graph and log (e.g., record, capture, collect) a first set of structural composition data (e.g., information characterizing the number, type, and configuration of processing operations) of the second portion of the first flow graph.

In embodiments, a second portion of the second flow graph may be analyzed. The analyzing may occur with respect to a second subset of the second set of stream computing processing operations of the second stream computing application. The second portion of the second flow graph may include a segment, piece, section, or part of the second flow graph (e.g., beginning, middle, or end of the first flow graph). The second portion of the second flow graph may be different from (e.g., mutually exclusive, not overlap with) the first portion of the second flow graph. The second subset of the second set of stream computing processing operations may include a collection, group, or batch of stream computing processing operations included in the second set of stream computing processing operations. In embodiments, the second subset of the second set of stream computing processing operations may include those stream computing processing operations included in the second portion of the second flow graph. In embodiments, analyzing the second portion of the second flow graph may include utilizing a stream computing analysis module to crawl through the second portion of the second flow graph and log (e.g., record, capture, collect) a second set of structural composition data (e.g., information characterizing the number, type, and configuration of processing operations) of the second portion of the second flow graph.

The second portion of the first flow graph may be compared with the second portion of the second flow graph. Generally, comparing can include contrasting, analyzing, investigating, correlating, juxtaposing, or otherwise evaluating the second portion of the first flow graph in parallel with the second portion of the second flow graph. In embodiments, comparing may include examining the first set of structural composition data for the second portion of the first flow graph with respect to the second set of structural composition data for the second portion of the second flow graph. A mismatch of the second portions of the first and second flow graphs may be determined. The determining may occur based on comparing the second portion of the first flow graph with the second portion of the second flow graph. The mismatch may include a difference, discrepancy, divergence, incongruence, or other dissimilarity between the structural (e.g., type, number, arrangement of processing operations) or operational (e.g., effect/result on output data) characteristics of the second portion of the first flow graph and the second portion of the second flow graph. For instance, the mismatch may include a stream operator or processing element that exists in the second portion of one of the flow graphs but not the other. As an example, determining the mismatch may include determining (e.g., by comparing the second portions of the first and second flow graphs) that the second portion of the first flow graph includes a first filter operator, a second filter operator, a join operator and a sort operator, whereas the second portion of the second flow graph includes a first filter operator, a second filter operator, a join operator, and a functor operator (e.g., the last stream operator in the second portion of each flow graph is different). In embodiments, a stop-position may be indicated with respect to establishment of the single set of stream computing processing operations for both the first and second stream computing applications. The indicating may occur in response to determining the mismatch of the second portions of the first and second flow graphs. Generally, indicating may include marking, pointing-out, specifying, designating, or otherwise establishing the stop-position. The stop-position may include a particular location of a flow graph that marks, specifies, or designates the point where analysis of a portion of the flow graph may end (e.g., conclude, terminate.) In embodiments, indicating may include defining the stop-position with respect to a stream operator or processing element at which the mismatch was detected. Other methods of run-time operation efficiency management based on a mismatch between portions of flow graphs are also possible.

In embodiments, a start-position at an initial-operation of the first flow graph may be selected at module 1023. Aspects of the disclosure relate to the recognition that, in some situations, structural or operational matches between processing operations are more likely to occur at the beginning of flow graphs (e.g., applications may perform the same initial operations on data before using it for more specialized purposes). Accordingly, aspects of the disclosure relate to selecting a start-position at an initial-operation of the first flow graph. The selecting may occur with respect to the first subset of the first set of stream computing processing operations of the first stream computing application. Generally, selecting can include choosing, picking, deciding, nominating, identifying, or otherwise ascertaining a start-position at an initial operation of the first flow graph. The start-position may include a particular location of the first flow graph that marks, specifies, or designates the point where analysis of the first portion of the first flow graph may begin. The initial-operation may include a stream operator, processing element, or other processing operation that is located at the beginning of the first flow graph (e.g., very first operator, earliest operator, farthest upstream operator). In embodiments, selecting the start-position at an initial-operation may include examining the first flow graph (e.g., using a stream computing analysis module) to ascertain the furthest upstream operator (e.g., initial-operation) of the first flow graph, and marking the furthest upstream operator with a tag, flag, or other identifier to indicate the start-position. Accordingly, as described herein, analysis of the first portion of the first flow graph may be initiated from the start-position. Other methods of selecting the start-position at the initial-operation of the first flow graph are also possible.

In embodiments, a start-position at a data-ingest-operation of the first flow graph may be selected at module 1024. Aspects of the disclosure relate to the recognition that, in some situations, a plurality of applications maintained in the same distributed computing environment may be configured to ingest the same data. Accordingly, aspects of the disclosure relate to selecting a start-position at a data-ingest-operation of the first flow graph (e.g., such that analysis of the first flow graph with respect to a second flow graph may identify the data-ingest-operation as a redundancy between two or more applications). The selecting may occur with respect to the first subset of the first set of stream computing processing operations of the first stream computing application. Generally, selecting can include choosing, picking, deciding, nominating, identifying, or otherwise ascertaining a start-position at a data-ingest-operation of the first flow graph. In embodiments, selecting may include examining an operator graph (e.g., in an integrated development environment (IDE) interface) to identify a stream operator, processing element, or other processing operation configured to read, import, capture, collect, aggregate, or otherwise bring data into the operator graph for processing. The identified stream operator may be marked using a tag, flag, or other identifier to indicate the start-position. Accordingly, as described herein, analysis of the first portion of the first flow graph may be initiated from the start-position. As an example, consider a first application configured to adjust fan speed for servers in a server case and a second application configured to allocate workloads to the servers in the server case. In embodiments, both the first application and the second application may be configured to ingest running temperature data for each server in the server case (e.g., to be used as a basis to determine how to adjust fan speeds and deploy workloads). Accordingly, as described herein, the flow graphs for both the first and second applications may be examined, and an ingest operator configured to import the running temperature data may be marked as the start-position for analysis of the first and second flow graphs. Other methods of selecting the start-position at the data-ingest-operation of the first flow graph are also possible.

In embodiments, new application deployment may occur at module 1025. An initiation of a third set of processing operations of a third application may be detected. The detecting may occur in the shared pool of configurable computing resources. Generally, detecting can include sensing, recognizing, discovering, distinguishing, identifying, or otherwise ascertaining the initiation of the third set of processing operations of a third application in the shared pool of configurable computing resources. The third application may include a software program, collection of computing instructions, or other set of computing code configured to perform a specific task or purpose in the shared pool of configurable computing resources. The third application may correspond to a third tenant (e.g., client/customer different than the first and second tenants). In embodiments, detecting deployment of a third application may include using a distributed computing management platform to monitor system resource utilization in the shared pool of configurable computing resources, and identifying that an additional set of processing operations has been allocated resources for utilization within the shared pool of configurable computing resources. In embodiments, detecting the third application may include receiving an access query (e.g., from a tenant) requesting authorization to initiate the third set of processing operations of the third application in the shared pool of configurable computing resources. In embodiments, the first set of processing operations of the first application may be compared with the third set of processing operations of the third application. Generally, comparing can include contrasting, analyzing, investigating, correlating, juxtaposing, or otherwise evaluating the first set of processing operations with respect to the third set of processing operations. In embodiments, as described herein, comparing may include examining structural and operational characteristics of the first set of processing operations with respect to the third set of processing operations to generate a qualitative or quantitative assessment of the degree of similarity between the first and second processing operations. Accordingly, in the event that a substantial match (e.g., redundancy) between the first and third sets of processing operations is determined, a single set of processing operations for both the first and third applications may be established in the shared pool of configurable computing resources.

Figure 11:
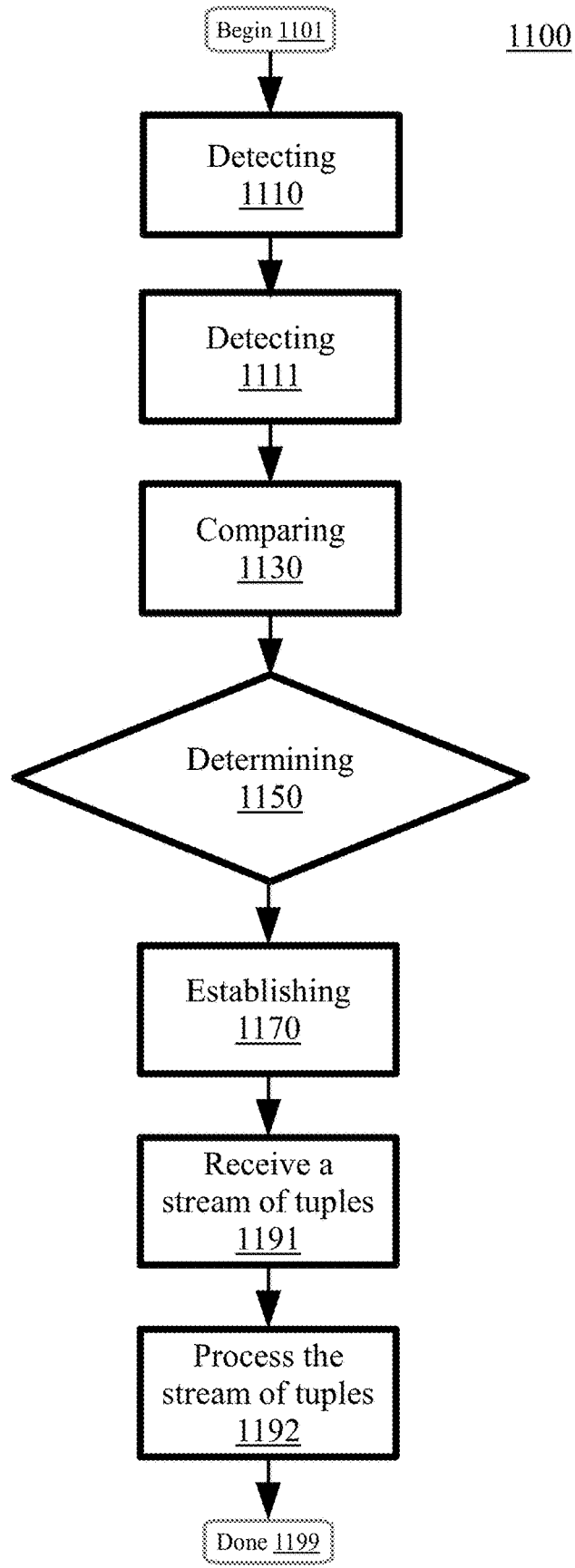
FIG. 11 is a flowchart illustrating a method of run-time operation efficiency management in a shared pool of configurable computing resources, according to embodiments.

FIG. 11 is a flowchart illustrating a method of run-time operation efficiency management in a shared pool of configurable computing resources, according to embodiments. The method 1100 may begin at block 1101. At block 1110, a first set of processing operations of a first application may be detected. The detecting may occur in the shared pool of configurable computing resources. At block 1111, a second set of processing operations of a second application may be detected. The detecting may occur in the shared pool of configurable computing resources. At block 1130, the first set of processing operations of the first application may be compared with the second set of processing operations of the second application. At block 1150, a substantial match of the first and second processing operations of the first and second applications may be determined. The determining may occur based on comparing the first set of processing operations of the first application with the second set of processing operations of the second application. At block 1170, a single set of processing operations for both the first and second applications may be established. The establishing may occur in the shared pool of configurable computing resources.

At block 1191, a stream of tuples may be received. The stream of tuples may be processed by a plurality of processing elements (e.g., stream operators) operating on a set of compute nodes (e.g., shared pool of configurable computing resources, in a stream application environment). The stream of tuples may be received consistent with the description herein including FIGS. 1-14. Current/future processing by the plurality of processing elements may be performed consistent with the description herein including FIGS. 1-14. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

At block 1192, the stream of tuples may be processed. The processing may occur using the set of processing elements operating on the set of compute nodes. The stream of tuples may be processed consistent with the description herein including FIGS. 1-14. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators. Method 1100 concludes at block 1199. Aspects of method 1100 may provide performance or efficiency benefits related to run-time operation efficiency management in a shared pool of configurable computing resources. Aspects may save resources such as bandwidth, processing, or memory.

Figure 12:
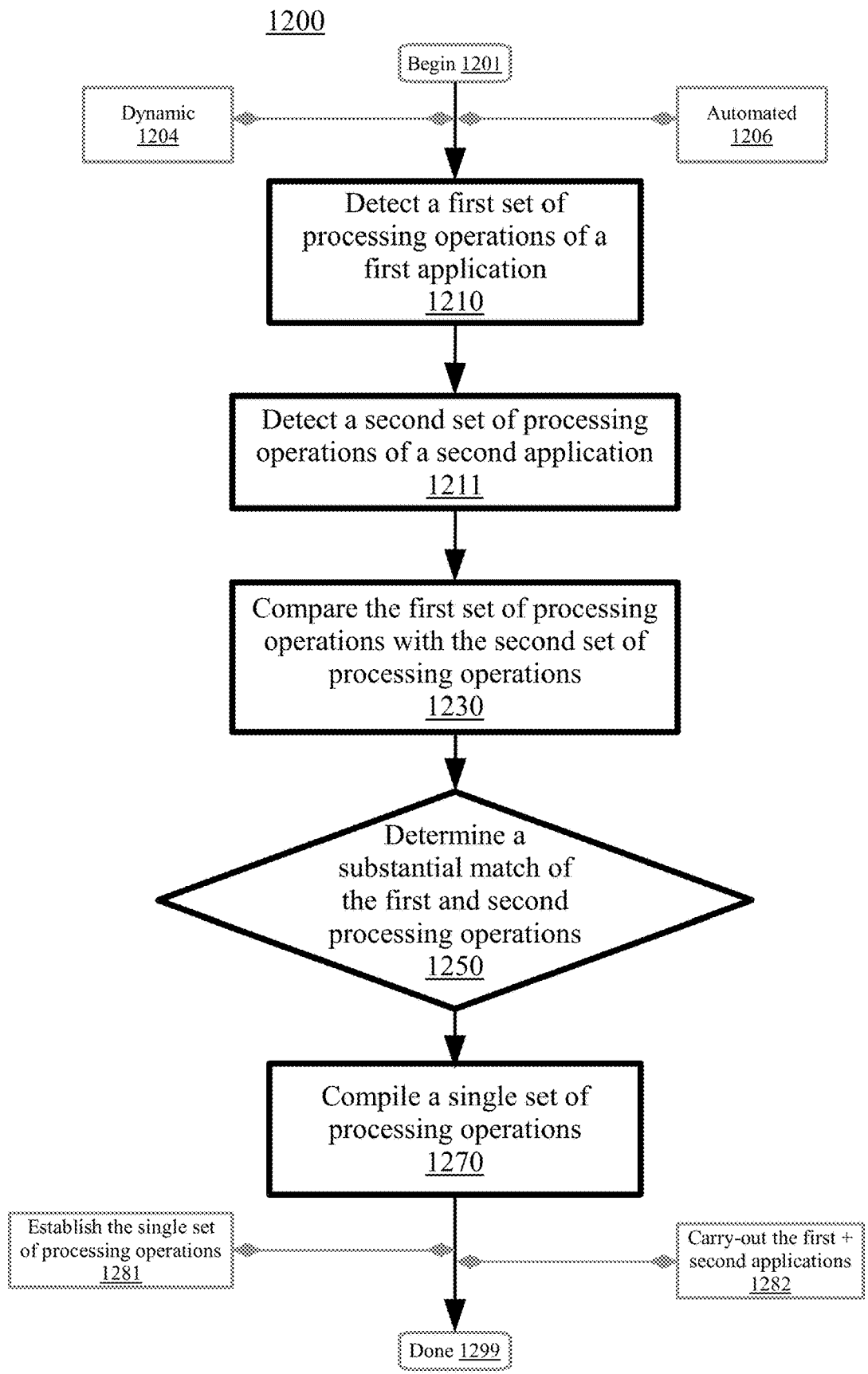
FIG. 12 is a flowchart illustrating a method of compile-time operation efficiency management in a shared pool of configurable computing resources, according to embodiments.

FIG. 12 is a flowchart illustrating a method of compile-time operation efficiency management in a shared pool of configurable computing resources, according to embodiments. Aspects of the disclosure relate to the recognition that, in some situations, computing applications (e.g., belonging to different tenants) stored on the same host infrastructure may perform the same functions as one another, resulting in challenges associated with operational redundancy and computing resource usage efficiency. Accordingly, aspects of the disclosure relate to detecting redundancies between two or more computing applications in a distributed computing environment at application compile-time based on meta-data (e.g., component data) detected during at application compile-time. As such, aspects of method 1200 relate to determining a substantial match with respect to a first set of processing operations of a first application and a second set of processing operations of a second application in a distributed computing environment, and establishing a single set of processing operations for both the first and second applications in the shared pool of configurable computing resources (e.g., to reduce/eliminate redundancy between the first and second applications). In embodiments, the shared pool of configurable computing resources may include a distributed computing environment. For example, the shared pool of configurable computing resources may include a public cloud environment, a private cloud environment, an on-premises computing cluster, a hybrid cloud environment, or the like. In embodiments, aspects of the disclosure relate to detecting redundancies between applications at application compile-time. Generally, application compile-time may refer to the generation of programming code written in a first programming language (e.g., a high-level programming language) and the translation, conversion, or transformation of the programming code into a second programming language (e.g., a lower-level programming language such as assembly language or machine code) using a compiler. Compile-time may include converting the source code to create an executable program to be run by a computer. The method 1200 may begin at block 1201.

In embodiments, the detecting of the first set of processing operations of the first application, the detecting of the second set of processing operations of the second application, the comparing, the determining, the compiling, and the other steps described herein may each be executed in a dynamic fashion at block 1204. The steps described herein may be executed in a dynamic fashion to streamline compile-time operation efficiency management in the shared pool of configurable computing resources. For instance, the detecting of the first set of processing operations of the first application, the detecting of the second set of processing operations of the second application, the comparing, the determining, the compiling, and the other steps described herein may occur in real-time, ongoing, or on-the-fly. As an example, one or more steps described herein may be performed in real-time (e.g., substantial matches between a plurality of processing operations may be dynamically determined as applications are compiled) in order to streamline (e.g., facilitate, promote, enhance) compile-time operation efficiency management in the shared pool of configurable computing resources.

In embodiments, the detecting of the first set of processing operations of the first application, the detecting of the second set of processing operations of the second application, the comparing, the determining, the compiling, and the other steps described herein may each be executed in an automated fashion at block 1206. The steps described herein may be executed in an automated fashion without user intervention. In embodiments, detecting of the first set of processing operations of the first application, the detecting of the second set of processing operations of the second application, the comparing, the determining, the compiling, and the other steps described herein may be carried out by an internal compile-time operation efficiency management module maintained in a persistent storage device of a local computing device (e.g., network node). In embodiments, the detecting of the first set of processing operations of the first application, the detecting of the second set of processing operations of the second application, the comparing, the determining, the compiling, and the other steps described herein may be carried out by an external compile-time operation efficiency management module hosted by a remote computing device or server (e.g., server accessible via subscription, usage-based, or other service model). As such, aspects of compile-time operation efficiency management may be performed using automated computing machinery without manual action. Other methods of performing the steps described herein are also possible.

At block 1210, a first set of processing operations of a first application may be detected. The detecting may occur for utilization in the shared pool of configurable computing resources. Generally, detecting can include sensing, recognizing, discovering, distinguishing, identifying, or otherwise ascertaining the first set of processing operations of the first application. The first set of processing operations may include a collection of one or more steps, transactions, procedures, or other actions performed by a first application to process (e.g., analyze, examine, evaluate, transform) data (e.g., tuples) in the shared pool of configurable computing resources. For instance, the first set of processing operations may include routines, subroutines, code modules, or other source code elements that define functions or actions to join, filter, sort, or otherwise manage data in the shared pool of configurable computing resources. In embodiments, the first set of processing operations may be included in a set of un-compiled source code for a first application. The first application may include a software program, collection of computing instructions, or other set of computing code configured to perform a specific task or purpose in the shared pool of configurable computing resources. As an example, the first application may include a software program configured to sort inventory items of a retail store by price. In embodiments, detecting the first set of processing operations of the first application may include using a code analysis tool to parse a first set of source code of the first application and identify the operations and functions indicated by the code modules of the first application. As an example, the code analysis tool may detect a first set of processing operations including an ingest operation (e.g., to import a data feed) in the source code of a natural language processing application. Other methods of detecting the first set of processing operations of the first application in the shared pool of configurable computing resources are also possible.

At block 1211, a second set of processing operations of a second application may be detected. The detecting may occur for utilization in the shared pool of configurable computing resources. Generally, detecting can include sensing, recognizing, discovering, distinguishing, identifying, or otherwise ascertaining the second set of processing operations of the second application. The second set of processing operations may include a collection of one or more steps, transactions, procedures, or other actions performed by the second application to process (e.g., analyze, examine, evaluate, transform) data (e.g., tuples) in the shared pool of configurable computing resources. For instance, the second set of processing operations may include routines, subroutines, code modules, or other source code elements that define functions or actions to join, filter, sort, or otherwise manage data in the shared pool of configurable computing resources. In embodiments, the second set of processing operations may substantially correspond to the first set of processing operations. In embodiments, the first set of processing operations may be included in a set of un-compiled source code for a second application. The second application may include a software program, collection of computing instructions, or other set of computing code configured to perform a specific task or purpose in the shared pool of configurable computing resources. In embodiments, the second application may substantially correspond to the first application. For instance, the second application may include code modules or source code elements that define the same type/arrangement of stream operators as the first application, or different source code elements that bring about a similar function or result with respect to processed data. As an example, the second application may include a software program configured to sort library books by author (e.g., an application that performs similar operations as the previously mentioned first application that sorts inventory items of a retail store by price). As described herein, detecting the second set of processing operations of the second application may include using a code analysis tool to parse a second set of source code of the second application and identify the operations and functions indicated by the code modules of the second application. As an example, the code analysis tool may detect a second set of processing operations including a join operation to combine multiple streams of social media data into a single data stream. Other methods of detecting the second set of processing operations of the second application in the shared pool of configurable computing resources are also possible.

At block 1230, the first set of processing operations of the first application may be compared with the second set of processing operations of the second application. Generally, comparing can include contrasting, analyzing, investigating, correlating, juxtaposing, or otherwise evaluating the first set of processing operations of the first application in parallel with the second set of processing operations of the second application. In embodiments, comparing may be performed in response to detecting initiation of compilation with respect to either the first or second application. In embodiments, comparing the first set of processing operations with the second set of processing operations may include examining a first set of component data generated at compile time for the first application with respect to a second set of component data generated at compile time for the second application at compile time. The first and second sets of component data may include metadata created during compilation that indicates the type and sequence of operators, processing elements, composites (e.g., compound/fused operators), and stream functions included in the first and second applications, respectively. As an example, a set of component data for a particular application may indicate that the application utilizes a sorting operator, a delay operator, and a functor operator (e.g., in that sequence). In embodiments, comparing the first and second processing operations may include generating a qualitative or quantitative assessment of the degree of similarity between the first and second processing operations. As an example, comparing may include formulating and assigning a similarity score to a group of processing operations to indicate how closely they relate to one another (e.g., a similarity score of 100 may indicate they are identical, while a similarity score of 0 may indicate no distinguishable similarity). As another example, comparing may include compiling a list of identified similarities and differences between the compared sets of processing operations (e.g., for presentation to a user/administrator). Other methods of comparing the first set of processing operations of the first application with the second set of processing applications of the second application are also possible.

At block 1250, a substantial match of the first and second processing operations of the first and second applications may be determined. The determining may occur based on comparing the first set of processing operations of the first application with the second set of processing operations of the second application. Generally, determining can include formulating, calculating, resolving, computing, identifying, or otherwise ascertaining the substantial match of the first and second processing operations of the first and second applications. The substantial match may include an association, connection, correlation, or other relationship that indicates similarity between the first set of processing operations and the second set of processing applications. In embodiments, the substantial match may include structural or operational identicalness between the first and second sets of processing operations (e.g., the first and second sets of processing operations make use of the same stream operators or produce the same output data as indicated by the first and second sets of component data). In embodiments, the substantial match may include equivalence between portions of the code structure (e.g., indicating the type and sequence of utilized routines and operations) between the first and second sets of processing operations (e.g., the first and second sets of processing operations may use different code modules or functions that bring about the same result). In embodiments, determining the substantial match between the first set of processing operations and the second set of processing operations may include calculating a similarity score for the first and second sets of processing operations with respect to one another, and ascertaining that the similarity score achieves a similarity threshold. The similarity score may include a quantitative indication of the degree of correspondence, overlap, structural or operational closeness, agreement, or correlation between the first and second sets of processing operations (e.g., a similarity score of 100 may indicate that the first and second sets of processing operations are identical, while a similarity score of 0 may indicate no distinguishable similarity). Calculating the similarity score may include examining the first and second sets of component data to ascertain the type, quantity, arrangement, and usage history of source code elements of the first and second sets of processing operations, and subsequently generating a quantitative assessment of the correspondence between the first and second sets of processing operations as indicated by the first and second sets of component data. As an example, a first set of processing operations including source code elements that define an aggregation operation, a first filter operation, and a second filter operation may be assigned a similarity score of 92 with respect to a second set of processing operations including an aggregation operation and a compound filter operation (e.g., the compound filter operation of the second set of processing operations may filter data in substantially the same manner as the first and second filter operations of the first set of processing operations). The similarity score of 92 may be compared with respect to a similarity threshold of 85, and it may be determined that the first and second sets of processing operations are associated with a substantial match with respect to one another. Other methods of determining the substantial match of the first and second processing operations of the first and second applications are also possible.

At block 1270, a single set of processing operations for both the first and second applications may be compiled. The compiling may occur for utilization in the shared pool of configurable computing resources. Generally, compiling can include building, arranging, organizing, assembling, constructing, generating, or otherwise structuring the single set of processing operations for both the first and second applications. The single set of processing operations may include an individual collection of one or more steps, transactions, procedures, or other actions to process (e.g., analyze, examine, evaluate, transform) data (e.g., tuples) in the shared pool of configurable computing resources. In embodiments, the single set of processing operations may be configured to perform one or more functions that substantially correspond to (e.g., have the same effect on data, process data in the same way) the first set of processing operations and the second set of processing operations such that the first and second sets of processing operations may be replaced by the single set of processing operations. In embodiments, compiling the single set of processing operations may include transforming a first source code element of the first set of processing operations and a second source code element of the second set of processing elements into a single executable unit in a target computing language (e.g., assembly language, machine code). The single executable unit may be configured to perform the same operations, tasks, or functions as the first and second sets of processing operations, and be utilized by both the first and second applications in the shared pool of configurable computing resources. As an example, consider a first source code element defining a "sort operation" to sort data by date from oldest to newest, and a second source code element defining a "filter operation" to remove data that is older than a particular date (e.g., Dec. 1, 2016). Accordingly, compiling may include generating a single set of processing operations (e.g., custom executable unit) configured to perform the functions of both the "sort operation" and the "filter operation" as a single operation that may be used by both the first and second applications in the shared pool of configurable computing resources. Other methods of compiling the single set of processing operations for both the first and second applications in the shared pool of configurable computing resources are also possible.

In embodiments, the single set of processing operations for both the first and second applications may be established at block 1281. The establishing may occur in the shared pool of configurable computing resources. Generally, establishing can include instantiating, creating, setting-up, organizing, introducing, providing, assembling, arranging, generating, or otherwise structuring the single set of processing operations for both the first and second applications in the shared pool of configurable computing resources. In embodiments, establishing the single set of processing operations may include introducing a shared application segment in the shared pool of configurable computing resources to take the place of both the first set of processing operations of the first application and the second set of processing operations of the second application. For instance, one or more stream operators may be structured in an operator graph of the shared pool of configurable computing resources to supersede (e.g., replace, override) both the first set of processing operations and the second set of processing operations. In embodiments, establishing may include deploying (e.g., allocating, assigning) the single set of processing operations to the shared pool of configurable computing resources such that the single set of processing operations are communicatively connected to the same respective operators and processing elements as the first and second sets of processing operations. As an example, consider than an operator graph of a shared pool of configurable computing resources may include a first set of processing operations to filter out tuples greater than 1000 kilobytes in size from a first data stream, and a second set of processing operations to filter out tuples greater than 1000 kilobytes in size from a second data stream. Accordingly, establishing the single set of processing operations may include creating and deploying a shared application segment to replace the first and second sets of processing operations that includes a single filter operation to filter out tuples greater than 1000 kilobytes in size from both the first and second streams of data. Other methods of establishing the single set of processing applications for both the first and second applications in the shared pool of configurable computing resources are also possible.

In embodiments, both the first and second applications may be carried-out at block 1282. The carrying-out may occur using the single set of processing operations. Generally, carrying-out can include implementing, instantiating, initiating, utilizing, running, or otherwise executing both the first and second applications using the single set of processing operations. In embodiments, carrying-out both the first and second applications may include running the first and second applications using the single set of processing operations. For instance, carrying-out may include processing a set of data (e.g., tuples) or performing an operation (e.g., join operation, sort operation, filter operation) for the first application and the second application using the single set of processing operations (e.g., and not using the first set of processing operations or the second set of processing operations). As an example, consider that a single set of processing operations including a join operation to combine data from two separate streams is established in the shared pool of configurable computing resources. Accordingly, carrying-out the first and second applications may include using the single set of processing operations including the join operation to combine data from the two separate data streams, and subsequently routing the data to subsequent operators of both the first and second applications, respectively (e.g., for independent processing). Other methods of carrying-out the first and second applications using the single set of processing operations are also possible.

Consider the following example. A first set of source code for a first application may be analyzed to identify a collection of source code elements that define processing operations including an ingest operation to import a first set of IoT data related to precipitation measurements, a delay operation to delay the first set of IoT data for 5 minutes (e.g., until the data matures/becomes valid), and a sort operation to organize the precipitation measurements from least to greatest. In embodiments, a second set of source code for a second application may be analyzed to identify a collection of source code elements that define processing operations including an ingest operation to import a second set of IoT data related to temperature measurements, a delay operation to delay the second set of IoT data for 5 minutes (e.g., until a downstream processing engine can receive it), and a sort operation to organize the temperature measurements from least to greatest. In embodiments, at compile-time, a first set of component data indicating the type, sequence, and arrangement of operators may be generated for the first set of processing operations, and a second set of component data indicating the type, sequence, and arrangement of operators may be generated for the second set of processing operations. As described herein, the first set of component data and the second set of component data may be compared with one another to ascertain a degree of similarity between the first set of processing operations and the second set of processing operations. In embodiments, based on the comparison, it may be ascertained that both the first and second sets of processing operations perform the same type and sequence of processing operations (e.g., on different data streams). Accordingly, as described herein, a substantial match of the first and second sets of processing operations may be determined based on the comparison between the first and second sets of component data. In response to determining the substantial match, a single set of processing operations (e.g., to replace the first and second sets of processing operations) may be established. For instance, a single set of processing operations including an ingesting operation to ingest the first and second sets of IoT data, a delay operator to delay the first and second sets of IoT data by 5 minutes, and a sort operator to sort the first and second sets of IoT data by magnitude from least to greatest may be introduced as a shared application segment in the shared pool of configurable computing resources (e.g., to supersede both the first and second sets of processing operations). As such, both the first and second application may make use of the single set of processing applications (e.g., facilitating resource usage efficiency).

Method 1200 concludes at block 1299. Aspects of method 1200 may provide performance or efficiency benefits related to compile-time operation efficiency management in a shared pool of configurable computing resources. Aspects may save resources such as bandwidth, processing, or memory. As an example, replacing both the first and second sets of processing operations with the single set of processing operations may reduce the processing resources, network bandwidth, and memory resources used by host computing infrastructure. Altogether, performance or efficiency benefits with respect to operation efficiency in a distributed batch data processing environment may occur (e.g., speed, flexibility, load balancing, responsiveness, high availability, resource usage, productivity).

Figure 13:
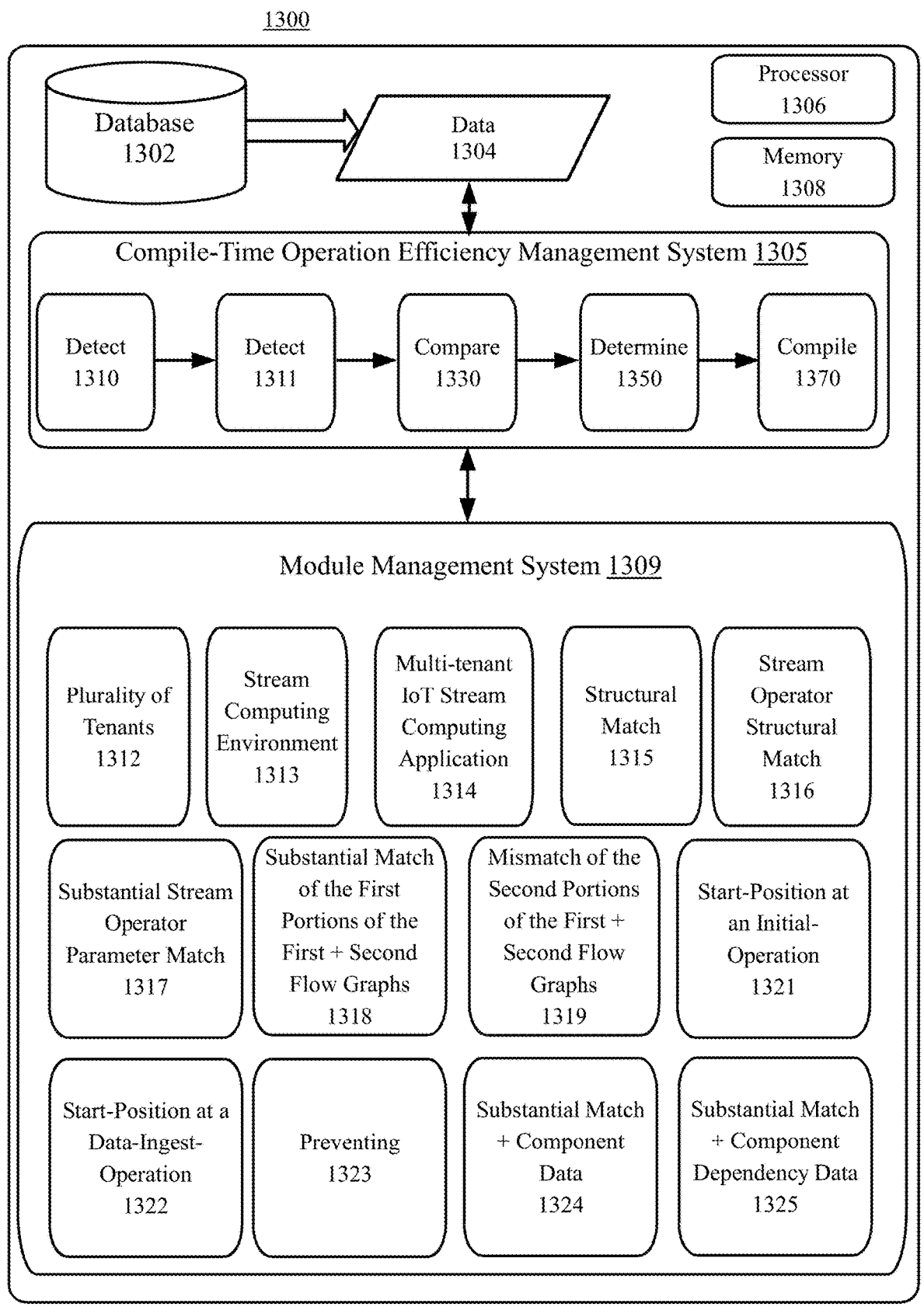
FIG. 13 shows an example system of compile-time operation efficiency management in a shared pool of configurable computing resources, according to embodiments.

FIG. 13 shows an example system 1300 of compile-time operation efficiency management in a shared pool of configurable computing resources, according to embodiments. The example system 1300 may include a processor 1306 and a memory 1308 to facilitate implementation of compile-time operation efficiency management. The example system 1300 may include a database 1302 configured to maintain data used for compile-time operation efficiency management. In embodiments, the example system 1300 may include a compile-time operation efficiency management system 1305. The compile-time operation efficiency management system 1305 may be communicatively connected to the database 1302, and be configured to receive data (e.g., tuples, data blocks) 1304 related to compile-time operation efficiency management. The compile-time operation efficiency management system 1305 may include a detecting module 1310 to detect a first set of processing operations, a detecting module 1311 to detect a second set of processing operations, a comparing module 1330 to compare the first and second set of processing operations, a determining module 1350 to determine a substantial match, and an compiling module 1370 to compile a single set of processing operations. The compile-time operation efficiency management system 1305 may be communicatively connected with a module management system 1309 that includes one or more modules or sub-modules for implementing aspects of compile-time operation efficiency management.

In embodiments, the shared pool of configurable computing resources may include a plurality of tenants at module 1312. The plurality of tenants may include both a first tenant and a second tenant. Aspects of the disclosure relate to the recognition that, in some embodiments, a plurality of tenants may make use of the same shared pool of configurable computing resources. Accordingly, aspects of the disclosure relate to establishing a single set of processing operations to simultaneously service applications of multiple tenants of the shared pool of configurable computing resources. In embodiments, it may be detected that the first tenant corresponds to the first application. Generally, detecting can include sensing, recognizing, discovering, distinguishing, identifying, or otherwise ascertaining that the first tenant corresponds to the first application. The first tenant may include a client, customer, patron, company, organization, entity or other group of one or more users who share common access with specific privileges to make use of the shared pool of configurable computing resources to facilitate operation of the first application. In embodiments, detecting that the first tenant corresponds to the first application may include analyzing metadata for the first application and sensing that the first application is owned by the first tenant and maintained on the shared pool of configurable computing resources. In embodiments, it may be detected that the second tenant corresponds to the second application. The second tenant may include a client, customer, patron, company, organization, entity or other group of one or more users who share a common access with specific privileges to make use of the shared pool of configurable computing resources to facilitate operation of the second application. In embodiments, detecting that the second tenant corresponds to the second application may include searching a tenant database for the shared pool of configuring resources, and ascertaining that the second tenant is registered as an authorized user with respect to the second application. In embodiments, the single set of processing operations for both the first and second applications of both the first and second tenants may be compiled. The compiling may occur for utilization in the shared pool of configurable computing resources. Generally, compiling can include building, arranging, organizing, assembling, constructing, generating, or otherwise structuring the single set of processing operations for both the first and second applications. As described herein, compiling the single set of processing operations may include transforming a first source code element of the first set of processing operations and a second source code element of the second set of processing elements into a single executable unit in a target computing language (e.g., assembly language, machine code). As such, both the first and second tenants may make use of the same single set of processing operations to facilitate operation of the first and second applications, respectively. Other methods of managing a multi-tenant shared pool of configurable computing resources are also possible.

In embodiments, the shared pool of configurable computing resources may include a stream computing environment at module 1313. The stream computing environment may include a collection of one or more stream operators (e.g. processing elements) configured to perform operations (logic-based analysis, attribute modification) on data (e.g., tuples) as part of a stream computing application in real-time. In embodiments, a first set of stream computing processing operations of a first stream computing application may be detected (e.g., sensed, recognized, discovered, distinguished, identified, ascertained). The first set of stream computing processing operations may include one or more processes, procedures, or actions performed by stream operators of the stream computing environment in relation to the first application. As examples, the first set of stream computing processing operations may include join operations, filter operations, ingest operations, sort operations, or the like. The detecting may occur in the shared pool of configurable computing resources. In embodiments, detecting the first set of stream computing processing operations may include monitoring a task manager widget for the stream computing environment to identify that a particular set of stream processing operations have been initiated by the first application in the stream computing environment. In embodiments, a second set of stream computing processing operations of a second stream computing application may be detected. The detecting may occur in the shared pool of configurable computing resources. The second set of stream computing processing operations may include one or more processes, procedures, or actions performed by stream operators of the stream computing environment in relation to the second application (e.g., delay operations, aggregation operations, functor operations). In embodiments, detecting the second set of stream computing processing operations may include analyzing output tuples of the stream computing environment and identifying that the second set of stream computing processing operations have been performed on the tuples of the stream computing environment.

The first set of stream computing processing operations may be compared (e.g., contrasted, analyzed, investigated, correlated, juxtaposed, evaluated) with the second set of stream computing processing operations. In embodiments, comparing may include examining a first set of component data for the first set of stream computing operations with respect to a second set of component data for the second set of stream computing operations. The substantial match may be determined (e.g., formulated, calculated, resolved, computed, identified, ascertained) based on comparing the first set of stream computing processing operations with the second set of stream computing processing operations. In embodiments, determining the substantial match may include ascertaining that the type, order or arrangement of stream operators of the first and second sets of stream computing processing operations achieve a similarity threshold with respect to one another. In embodiments, the single set of processing operations for both the first and second applications may be compiled. The compiling may occur for utilization in the shared pool of configurable computing resources. Generally, compiling can include building, arranging, organizing, assembling, constructing, generating, or otherwise structuring the single set of processing operations for both the first and second applications. As described herein, compiling the single set of processing operations may include transforming a first source code element of the first set of processing operations and a second source code element of the second set of processing elements into a single executable unit in a target computing language (e.g., assembly language, machine code). Other methods of compile-time operation efficiency management in a stream computing environment are also possible.

In embodiments, a multi-tenant Internet of Things (IoT) stream computing application may occur at module 1314. The shared pool of configurable computing resources may include a plurality of tenants including both a first tenant and a second tenant. The multi-tenant IoT stream computing application may include a stream computing application configured to process data captured from an IoT environment. The IoT environment may include a network of interconnected sensors, devices, vehicles, buildings, and other items to facilitate data collection, communication, and connectivity. As an example, the multi-tenant IoT stream computing application may include a collection of stream operators configured to ingest and analyze heart rate data for a group of patients of a hospital (e.g., as captured by IoT devices including heart rate monitors, artificial pacemakers, and other biometric sensors). In embodiments, it may be detected (e.g., sensed, recognized, discovered, distinguished, identified, ascertained) that the first tenant corresponds to the first set of stream computing processing operations of a first IoT stream computing application, and that the second tenant corresponds to the second set of stream computing processing operations of a second IoT stream computing application. In embodiments, detecting may include searching a tenant database for the shared pool of configuring resources, and ascertaining that the first tenant is registered as an authorized user with respect to a first IoT stream computing application and that the second tenant is registered as an authorized user with respect to a second IoT stream computing application. As an example, the first tenant may be associated with a first IoT stream computing application configured to compute the average heart rate of the group of patients, and the second tenant may be associated with a second IoT stream computing application configured to monitor for heart rate irregularities that may be indicative of impending heart attacks. In embodiments, the single set of processing operations for both the first and second IoT stream computing applications of both the first and second tenants may be compiled. The compiling may occur for utilization in the shared pool of configurable computing resources. Generally, compiling can include building, arranging, organizing, assembling, constructing, generating, or otherwise structuring the single set of processing operations for both the first and second applications. As described herein, compiling the single set of processing operations may include transforming a first source code element of the first set of processing operations and a second source code element of the second set of processing elements into a single executable unit in a target computing language (e.g., assembly language, machine code). Other methods of managing compile-time operation efficiency management in a multi-tenant IoT stream computing environment are also possible. In addition, other environments are possible such as a (multi-tenant) data science stream computing environment, a (multi-tenant) social media stream computing environment, or the like.

In embodiments, a structural match may occur at module 1315. A first structure of the first set of processing operations of the first application may be compared with a second structure of the second set of processing operations of the second application. Generally, comparing can include contrasting, analyzing, investigating, correlating, juxtaposing, or otherwise evaluating the first structure of the first set of processing operations of the first application with respect to the second structure of the second set of processing operations of the second application. The first and second structures may include characteristics, traits, or attributes that indicate the arrangement, composition, framework, make-up, format, syntax, design, or infrastructure of the first and second sets of processing operations, respectively. As an example, the first and second structures may include the order or sequence in which particular tasks of the first and second sets of processing operations are performed. In embodiments, comparing may include examining the first structure of the first set of processing operations with respect to the second structure of the second set of processing operations to ascertain the similarity between the first and second structures. In embodiments, a structural match of the first and second structures of the first and second processing operations of the first and second applications may be determined. The determining may occur based on comparing the first structure of the first set of processing operations of the first application with the second structure of the second set of processing operations of the second application. The structural match may include an association, connection, correlation, or other relationship that indicates similarity, equivalence, or identicalness between the first structure and the second structure. As an example, determining the structural match may include ascertaining that both the first and second sets of processing operations perform a delay operation followed by an aggregation operation on sets of data. A single structure of the single set of processing operations for both the first and second applications may be compiled. The compiling may occur for utilization in the shared pool of configurable computing resources. Generally, compiling can include building, arranging, organizing, assembling, constructing, generating, or otherwise structuring the single structure of the single set of processing operations for both the first and second applications. The single structure may include an individual computing artifact configured to perform both the first and second sets of processing operations. As described herein, compiling the single structure of the single set of processing operations may include transforming a first source code element of the first set of processing operations and a second source code element of the second set of processing elements into a single executable unit in a target computing language (e.g., assembly language, machine code). Other methods of compile-time operation efficiency management in a shared pool of configurable computing resources are also possible.

In embodiments, a stream operator structural match may occur at module 1316. A first stream operator structure of the first set of stream computing processing operations of the first stream computing application may be compared with a second stream operator structure of the second set of stream computing processing operations of the second stream computing application. Generally, comparing can include contrasting, analyzing, investigating, correlating, juxtaposing, or otherwise evaluating the first stream operator structure with respect to the second stream operator structure. The first and second stream operator structures may include characteristics, traits, or attributes that indicate the arrangement, composition, framework, make-up, format, syntax, design, or infrastructure of the first and second sets of stream computing processing operations, respectively. As examples, the first and second stream operator structures may include the type, sequence, and configuration of stream operators included in the first and second stream computing applications, respectively. In embodiments, comparing may include contrasting a first operator graph for the first stream computing application with respect to a second operator graph for the second stream computing application. In embodiments, a stream operator structural match of the first and second stream operator structures of the first and second stream computing processing operations of the first and second stream computing applications may be determined. The determining may occur based on comparing the first stream operator structure of the first set of stream computing processing operations of the first stream computing application with the second stream operator structure of the second set of stream computing processing operations of the second stream computing application. The stream operator structural match may include an association, connection, correlation, or other relationship that indicates similarity, equivalence, or identicalness between the first stream operator structure and the second stream operator structure. As an example, determining the stream operator structural match may include ascertaining that both the first operator graph for the first stream computing application and the second operator graph for the second stream computing application include an ingest operator followed by a barrier operator and a sort operator. In embodiments, a single stream operator structure of the single set of stream computing processing operations for both the first and second stream computing application may be compiled. The compiling may occur for utilization in the shared pool of configurable computing resources. Generally, compiling can include building, arranging, organizing, assembling, constructing, generating, or otherwise structuring the single set of processing operations for both the first and second applications. The single stream operator structure may include a collection of stream operators, compounds (e.g., fused stream operators), or other processing elements configured to perform functions equivalent to both the first and second sets of stream computing processing operations. As described herein, compiling the single stream operator structure of the single set of processing operations may include transforming a first source code element of the first set of processing operations and a second source code element of the second set of processing elements into a single executable unit in a target computing language (e.g., assembly language, machine code). Other methods of compile-time operation efficiency management in a shared pool of configurable computing resources are also possible.

In embodiments, a substantial stream operator parameter match may occur at module 1317. A first set of stream operator parameters of the first set of stream computing processing operations of the first stream computing application may be compared with a second set of stream operator parameters of the second set of stream computing processing operations of the second stream computing application. Generally, comparing can include contrasting, analyzing, investigating, correlating, juxtaposing, or otherwise evaluating the first set of stream operator parameters with the second set of stream operator parameters. The first and second sets of stream operator parameters may include values that define a configuration, setting, behavior, of function of the first and second stream computing processing operations, respectively. As an example, the first and second sets of stream operator parameters may include a filter parameter for one or more filter operators that specify particular tuples that should be removed from a stream of tuples (e.g., remove all tuples with a time stamp indicating an age of 5 minutes or older). In embodiments, comparing may include evaluating the magnitude of the first set of stream operator parameters with the second set of stream operator parameters. In embodiments, a substantial stream operator parameter match of the first and second sets of stream operator parameters of the first and second stream computing processing operations of the first and second stream computing applications may be determined. The determining may occur based on comparing the first set of stream operator parameters of the first set of stream computing processing operations of the first stream computing application with the second set of stream operator parameters of the second set of stream computing processing operations of the second stream computing application. The substantial stream operator parameter match may include a correspondence or agreement between the first set of stream operator parameters and the second set of stream operator parameters within a parameter tolerance threshold. As an example, determining the substantial stream operator parameter match may include ascertaining that a first sort parameter (e.g., number of tuples to sort into groups) of "45 tuples" for a first set of stream computing processing operations and a second sort parameter of "50 tuples" for a second set of stream computing processing operations achieve a parameter tolerance threshold of "difference of less than 10 tuples." In embodiments, a single set of stream operator parameters of the single set of stream computing processing operations for both the first and second stream computing applications may be compiled. The compiling may occur for utilization in the shared pool of configurable computing resources. Generally, compiling can include building, arranging, organizing, assembling, constructing, generating, or otherwise structuring the single set of stream operator parameters of the single set of processing operations for both the first and second applications. In embodiments, compiling the single set of stream operator parameters may include assigning, defining, specifying, designating, or otherwise configuring one or more stream operator parameters of the single set of stream computing processing operations to have the same parameter values as corresponding stream operators of the first and second sets of stream computing processing operations at compile-time. Other methods of compile-time operation efficiency management in a shared pool of configurable computing resources are also possible.

In embodiments, a substantial match of the first portions of the first and second flow graphs may occur at module 1318. A first portion of a first flow graph may be analyzed. Generally, analyzing can include evaluating, resolving, parsing, querying, categorizing, investigating, or otherwise examining the first portion of the first flow graph. The first flow graph may include a representation of the structure, composition, or arrangement of the first set of stream computing processing operations (e.g., stream computing operators) as well as the path traversed by data (tuples) processed by the first application. The first portion of the first flow graph may include a segment, piece, section, or part of the first flow graph (e.g., beginning, middle, or end of the first flow graph). The analyzing may occur with respect to a first subset of the first set of stream computing processing operations of the first stream computing application. The first subset of the first set of stream computing processing operations may include a collection, group, or batch of stream computing processing operations included in the first set of stream computing processing operations. In embodiments, the first subset of the first set of stream computing processing operations may include those stream computing processing operations included in the first portion of the first flow graph. In embodiments, analyzing the first portion of the first flow graph may include utilizing a stream computing analysis module to crawl through the first portion of the first flow graph and log (e.g., record, capture, collect) a first set of structural composition data (e.g., information characterizing the number, type, and configuration of processing operations) of the first portion of the first flow graph.

In embodiments, a first portion of a second flow graph may be analyzed. The second flow graph may include a representation of the structure, composition, or arrangement of the second set of stream computing processing operations (e.g., stream computing operators) as well as the path traversed by data (tuples) processed by the second application. The first portion of the second flow graph may include a segment, piece, section, or part of the second flow graph (e.g., beginning, middle, or end of the first flow graph). The analyzing may occur with respect to a first subset of the second set of stream computing processing operations of the second stream computing application. The first subset of the second set of stream computing processing operations may include a collection, group, or batch of stream computing processing operations included in the second set of stream computing processing operations. In embodiments, the first subset of the second set of stream computing processing operations may include those stream computing processing operations included in the first portion of the second flow graph. In embodiments, analyzing the first portion of the second flow graph may include utilizing a stream computing analysis module to crawl through the first portion of the second flow graph and log (e.g., record, capture, collect) a second set of structural composition data (e.g., information characterizing the number, type, and configuration of processing operations) of the first portion of the second flow graph.

The first portion of the first flow graph may be compared with the first portion of the second flow graph. Generally, comparing can include contrasting, analyzing, investigating, correlating, juxtaposing, or otherwise evaluating the first portion of the first flow graph in parallel with the first portion of the second flow graph. In embodiments, comparing may include examining the first set of structural composition data for the first portion of the first flow graph with respect to the second set of structural composition data for the first portion of the second flow graph. A substantial match of the first portions of the first and second flow graphs may be determined. The determining may occur based on comparing the first portion of the first flow graph with the first portion of the second flow graph. Generally, determining can include formulating, calculating, resolving, computing, identifying, or otherwise ascertaining the substantial match of the first and second processing operations of the first and second applications. The substantial match may include an association, connection, correlation, or other relationship that indicates similarity between the first portion of the first flow graph and the first portion of the second flow graph. As described herein, the substantial match may include a structural (e.g., type, number, arrangement of processing operations) or operational (e.g., effect/result on output data) similarity, equivalence, or identicalness between the first portions of the first and second flow graphs. As an example, determining the substantial match may include determining that the first portions of both the first and second flow graphs include the same type of stream operators arranged in a different order. In embodiments, compilation of the single set of stream computing processing operations for both the first and second stream computing applications may be initiated. The initiating may occur in response to determining the substantial match of the first portions of the first and second flow graphs. Generally, compiling can include building, arranging, organizing, assembling, constructing, generating, or otherwise structuring the single set of processing operations for both the first and second applications. In embodiments, compiling the single set of processing operations may include re-compiling a first set of source code for the first application and a second set of source code for the second application to include the single set of processing operations. Other methods of compile-time operation efficiency management in a shared pool of configurable computing resources are also possible.

In embodiments, a mismatch of the second portions of the first and second flow graph may occur at module 1319. Aspects of the disclosure, in embodiments, relate to repeating/iterating performance analyzing, comparing, determining, and initiating operations for portions of a flow graph until a mismatch (e.g., difference) is detected between the first and second flow graphs. In embodiments, a second portion of the first flow graph may be analyzed. The second portion of the first flow graph may include a segment, piece, section, or part of the first flow graph (e.g., beginning, middle, or end of the first flow graph). The second portion of the first flow graph may be different from (e.g., mutually exclusive, not overlap with) the first portion of the first flow graph. The analyzing may occur with respect to a second subset of the first set of stream computing processing operations of the first stream computing application. The second subset of the first set of stream computing processing operations may include a collection, group, or batch of stream computing processing operations included in the first set of stream computing processing operations. In embodiments, the second subset of the first set of stream computing processing operations may include those stream computing processing operations included in the second portion of the first flow graph. In embodiments, analyzing the second portion of the first flow graph may include utilizing a stream computing analysis module to crawl through the second portion of the first flow graph and log (e.g., record, capture, collect) a first set of structural composition data (e.g., information characterizing the number, type, and configuration of processing operations) of the second portion of the first flow graph.

In embodiments, a second portion of the second flow graph may be analyzed. The analyzing may occur with respect to a second subset of the second set of stream computing processing operations of the second stream computing application. The second portion of the second flow graph may include a segment, piece, section, or part of the second flow graph (e.g., beginning, middle, or end of the first flow graph). The second portion of the second flow graph may be different from (e.g., mutually exclusive, not overlap with) the first portion of the second flow graph. The second subset of the second set of stream computing processing operations may include a collection, group, or batch of stream computing processing operations included in the second set of stream computing processing operations. In embodiments, the second subset of the second set of stream computing processing operations may include those stream computing processing operations included in the second portion of the second flow graph. In embodiments, analyzing the second portion of the second flow graph may include utilizing a stream computing analysis module to crawl through the second portion of the second flow graph and log (e.g., record, capture, collect) a second set of structural composition data (e.g., information characterizing the number, type, and configuration of processing operations) of the second portion of the second flow graph.

The second portion of the first flow graph may be compared with the second portion of the second flow graph. Generally, comparing can include contrasting, analyzing, investigating, correlating, juxtaposing, or otherwise evaluating the second portion of the first flow graph in parallel with the second portion of the second flow graph. In embodiments, comparing may include examining the first set of structural composition data for the second portion of the first flow graph with respect to the second set of structural composition data for the second portion of the second flow graph. A mismatch of the second portions of the first and second flow graphs may be determined. The determining may occur based on comparing the second portion of the first flow graph with the second portion of the second flow graph. The mismatch may include a difference, discrepancy, divergence, incongruence, or other dissimilarity between the structural (e.g., type, number, arrangement of processing operations) or operational (e.g., effect/result on output data) characteristics of the second portion of the first flow graph and the second portion of the second flow graph. For instance, the mismatch may include a stream operator or processing element that exists in the second portion of one of the flow graphs but not the other. As an example, determining the mismatch may include determining (e.g., by comparing the second portions of the first and second flow graphs) that the second portion of the first flow graph includes a delay operator to delay a stream of data for 2 minutes, a sort operator, and a barrier operator whereas the second portion of the second flow graph includes a delay operator to delay the stream of data for 2 minutes, a sort operator, and a functor operator (e.g., the last stream operator in the second portion of each flow graph is different). In embodiments, a stop-position may be indicated with respect to establishment of the single set of stream computing processing operations for both the first and second stream computing applications. The indicating may occur in response to determining the mismatch of the second portions of the first and second flow graphs. Generally, indicating may include marking, pointing-out, specifying, designating, or otherwise establishing the stop-position. The stop-position may include a particular location of a flow graph that marks, specifies, or designates the point where analysis of a portion of the flow graph may end (e.g., conclude, terminate.) In embodiments, indicating may include defining the stop-position with respect to a stream operator or processing element at which the mismatch was detected. Other methods of compile-time operation efficiency management based on a mismatch between portions of flow graphs are also possible.

In embodiments, a start-position at an initial-operation of the first flow graph may be selected at module 1321. Aspects of the disclosure relate to the recognition that, in some situations, structural or operational matches between processing operations are more likely to occur at the beginning of flow graphs (e.g., applications perform the same initial operations on data before using it for more specialized purposes). Accordingly, aspects of the disclosure relate to selecting a start-position at an initial-operation of the first flow graph. The selecting may occur with respect to the first subset of the first set of stream computing processing operations of the first stream computing application. Generally, selecting can include choosing, picking, deciding, nominating, identifying, or otherwise ascertaining a start-position at an initial operation of the first flow graph. The start-position may include a particular location of the first flow graph that marks, specifies, or designates the point where analysis of the first portion of the first flow graph may begin. The initial-operation may include a stream operator, processing element, or other processing operation that is located at the beginning of the first flow graph (e.g., very first operator, earliest operator, farthest upstream operator).

In embodiments, selecting the start-position at an initial-operation may include examining a first set of component data for the first flow graph (e.g., using a code analysis module) to ascertain the furthest upstream operator (e.g., initial-operation) of the first flow graph, and marking a source code element of the first application that defines the furthest upstream operator as the start-position. Accordingly, as described herein, analysis of the first portion of the first flow graph may be initiated from the start-position. Other methods of selecting the start-position at the initial-operation of the first flow graph are also possible.

In embodiments, a start-position at a data-ingest-operation of the first flow graph may be selected at module 1322. Aspects of the disclosure relate to the recognition that, in some situations, a plurality of applications maintained in the same distributed computing environment may be configured to ingest the same data. Accordingly, aspects of the disclosure relate to selecting a start-position at a data-ingest-operation of the first flow graph (e.g., such that analysis of the first flow graph with respect to a second flow graph may identify the data-ingest-operation as a redundancy between two or more applications). The selecting may occur with respect to the first subset of the first set of stream computing processing operations of the first stream computing application. Generally, selecting can include choosing, picking, deciding, nominating, identifying, or otherwise ascertaining a start-position at a data-ingest-operation of the first flow graph. In embodiments, selecting may include examining a first set of component data (e.g., created at compile time) for the first application, and parsing it to identify a source code module that is configured to read, import, capture, collect, aggregate, or otherwise bring data into the operator graph for processing. The identified source code module may be marked with a tag, flag, or other identifier to indicate the start-position. Accordingly, as described herein, analysis of the first portion of the first flow graph may be initiated from the start-position. As an example, consider a first application configured to analyze user sentiment data with respect to a product (e.g., video game system), and a second application configured to determine the degree of popularity for the same product. In embodiments, both the first application and the second application may be configured to ingest the same set of social media data (e.g., to be used as a basis to determine the sentiment and popularity of the product). Accordingly, as described herein, the flow graphs for both the first and second applications may be examined, and an ingest operator configured to import the set of social media data may be marked as the start-position for analysis of the first and second flow graphs. Other methods of selecting the start-position at the data-ingest-operation of the first flow graph are also possible.

In embodiments, preventing may occur at module 1323. As described herein, aspects of the disclosure relate to utilizing a single set of processing operations to eliminate operational redundancy in the shared pool of configurable computing resources. In embodiments, aspects of the disclosure relate to preventing establishment of the first set of processing operations of the first application in the shared pool of configurable computing resources (e.g., to avoid redundancy). Generally, preventing can include avoiding, stopping, delaying, forbidding, blocking, prohibiting, restricting, or otherwise limiting establishment (e.g., and carrying-out) of the first set of processing operations. In embodiments, preventing establishment of the first set of processing operations may include disabling a set of source code modules that correspond to the first set of processing operations within a first set of source code for the first application. As an example, a first set of source code modules that correspond to a first set of processing operations including an aggregation operation may be disabled within the first set of source code for the first application. In embodiments, establishment of the second set of processing operations of the first application in the shared pool of configurable computing resources may be prevented. In embodiments, preventing establishment of the second set of processing operations may include modifying a set of operation permissions to block the second set of processing operations from being established or carried-out in the shared pool of configurable computing resources. In embodiments, the single set of processing operations for both the first and second applications may be configured. The configuring may occur to fulfill the first and second sets of processing operations of the first and second applications in the shared pool of configurable computing resources. Generally, configuring can include setting-up, programming, organizing, structuring, instructing, or otherwise arranging the single set of processing operations to fulfill (e.g., perform, accomplish) the first and second sets of processing operations. In embodiments, configuring the single set of processing operations may include structuring the single set of processing operations to perform substantially the same functions, processes, or actions as both the first and second sets of processing operations. As an example, for a first and second set of processing operations that both include an ingest operator and a join operator, configuring may include generating the single set of processing operations to include source code modules to implement data ingest and join operations. In this way, both the first and second applications may make use of the single set of processing operations to fulfill the first and second sets of processing operations. Other methods of preventing establishment (e.g., and carrying-out) of the first and second sets of processing operations and configuring the single set of processing operations are also possible.

In embodiments, a substantial match of the first and second processing operations and component data may occur at module 1324. A first set of component data may be generated. As described herein, the first set of component data may include metadata created at compilation time that indicates the type and quantity of operators, processing elements, composites (e.g., compound/fused operators), and stream functions used in the first application. The first set of component data may indicate a first set of components utilized to develop the first set of processing operations of the first application. The first set of components may include routines, subroutines, functions, and other code elements configured to implement one or more aspects of the first set of processing operations of the first application. In embodiments, generating the first set of component data may include utilizing a compiler to examine a first set of source code for the first application, and generate a set of metadata that characterizes the structure (e.g., operator type, quantity, placement) of the first application. In embodiments, a second set of component data may be generated. The second set of component data may include metadata created at compilation time that indicates the type and quantity of operators, processing elements, composites (e.g., compound/fused operators), and stream functions used in the second application. The second set of component data may indicate a second set of components utilized to develop the second set of processing operations of the second application. The second set of components may include routines, subroutines, functions, and other code elements configured to implement the second set of processing operations of the second application. In embodiments, the first set of component data may be compared with the second set of component data. The comparing may relate to the first and second sets of components. Generally, comparing can include contrasting, analyzing, investigating, correlating, juxtaposing, or otherwise evaluating the first and second sets of component data in parallel. In embodiments, comparing may include examining the first and second sets of component data with respect to each other to ascertain the degree of similarity between the type, order, and arrangement of the first and second sets of processing operations. In embodiments, the substantial match of the first and second processing operations of the first and second applications may be determined. The determining may be based on comparing the first set of component data with the second set of component data. The substantial match may include an association, connection, correlation, or other relationship that indicates similarity, equivalence, or identicalness between the first set of component data and the second set of component data. As an example, determining the substantial match may include ascertaining that both the first and second applications include code modules for performing a sort operation, a filter operation, and a functor operation in the same sequence (e.g., as indicated by the first and second sets of component data). Other methods of determining the substantial match based on the first and second sets of component data are also possible.

In embodiments, a substantial match of the first and second processing operations and component dependency data may occur at module 1325. A first set of component dependency data may be generated. The first set of component dependency data may include metadata created at compilation time that indicates the sequence and arrangement between operators, processing elements, composites (e.g., compound/fused operators), and stream functions used in the first application. The first set of component dependency data may indicate a first dependency among a first set of components utilized to develop the first set of processing operations of the first application. The first dependency may include an association that indicates a reliance, contingence, or sequential relationship between one or more components of the first set of components. As an example, the first dependency may indicate that a component defining a sort operation occurs subsequent to a filter operation. In embodiments, generating the first set of component dependency data may include parsing the first set of components to ascertain the sequence in which the first set of components are arranged, and creating an annotation to indicate the sequence. In embodiments, a second set of component dependency data may be generated. The second set of component dependency data may include metadata created at compilation time that indicates the sequence and arrangement between operators, processing elements, composites (e.g., compound/fused operators), and stream functions used in the second application. The second set of component dependency data may indicate a second dependency among a second set of components utilized to develop the second set of processing operations of the second application. The second dependency may include an association that indicates a reliance, contingence, or sequential relationship between one or more components of the second set of components. As an example, the second dependency may indicate that a component defining a sort operation occurs subsequent to a filter operation. The first set of component dependency data may be compared with the second set of component dependency data. The comparing may occur related to the first and second dependencies. Generally, comparing can include contrasting, analyzing, investigating, correlating, juxtaposing, or otherwise evaluating the first and second sets of component dependency data in parallel. In embodiments, comparing may include examining the first and second sets of component dependency data with respect to each other to ascertain the degree of similarity between the arrangement or sequence of the first and second sets of processing operations. In embodiments, a substantial match of the first and second processing operations of the first and second applications may be determined. The determining may occur based on comparing the first set of component dependency data with the second set of component dependency data. The substantial match may include an association, connection, correlation, or other relationship that indicates similarity, equivalence, or identicalness between the first set of component dependency data and the second set of component dependency data. For instance, determining the substantial match may include ascertaining that both the first dependency of the first set of components and the second dependency of the second set of components indicate the same type of operators in the same sequence. As an example, it may be ascertained that both the first dependency and the second dependency indicate that a component defining a sort operation occurs subsequent to a component defining a filter operation. Other methods of determining the substantial match based on the first and second sets of component dependency data are also possible.

Figure 14:
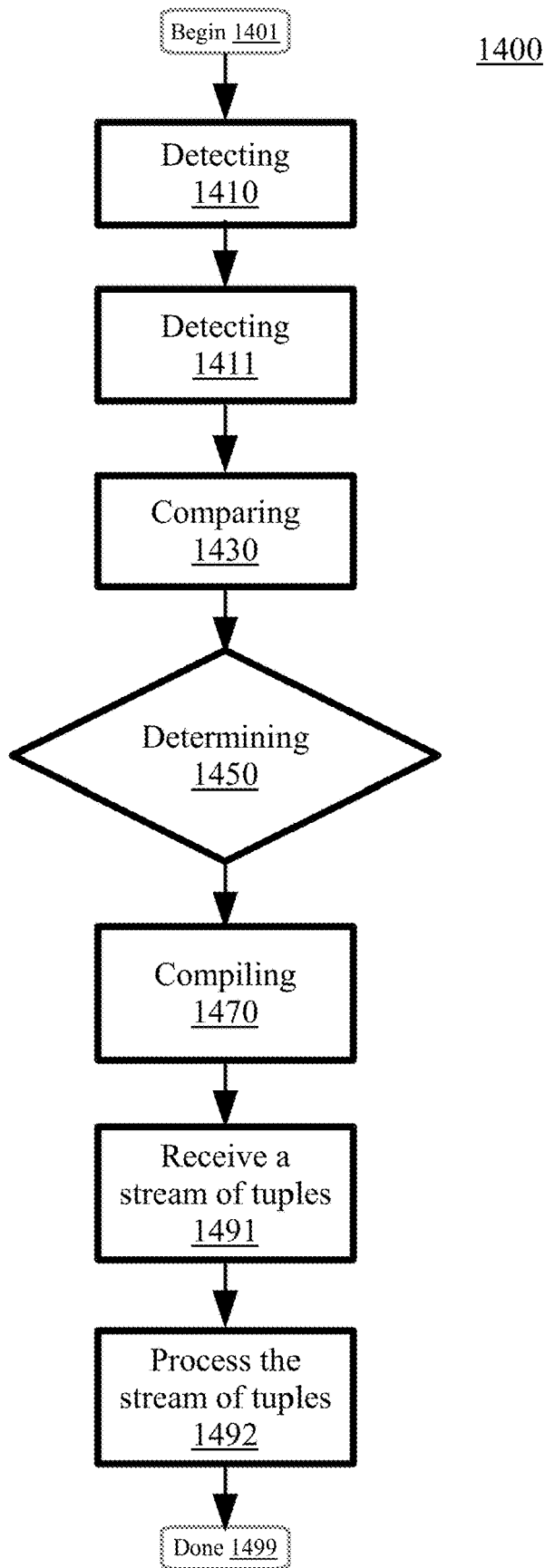
FIG. 14 is a flowchart illustrating a method of compile-time operation efficiency management in a shared pool of configurable computing resources, according to embodiments.

FIG. 14 is a flowchart illustrating a method of compile-time operation efficiency management in a shared pool of configurable computing resources, according to embodiments. The method 1400 may begin at block 1401. At block 1410, a first set of processing operations of a first application may be detected. The detecting may occur for utilization in the shared pool of configurable computing resources. At block 1411, a second set of processing operations of a second application may be detected. The detecting may occur for utilization in the shared pool of configurable computing resources. At block 1430, the first set of processing operations of the first application may be compared with the second set of processing operations of the second application. At block 1450, a substantial match of the first and second processing operations of the first and second applications may be determined. The determining may occur based on comparing the first set of processing operations of the first application with the second set of processing operations of the second application. At block 1470, a single set of processing operations for both the first and second applications may be compiled. The compiling may occur for utilization in the shared pool of configurable computing resources.

At block 1491, a stream of tuples may be received. The stream of tuples may be received to be processed by a set of processing elements which operates on a set of compute nodes. The stream of tuples may be processed by a plurality of processing elements (e.g., stream operators) operating on a set of compute nodes (e.g., shared pool of configurable computing resources, in a stream application environment). The stream of tuples may be received consistent with the description herein including FIGS. 1-14. Current/future processing by the plurality of processing elements may be performed consistent with the description herein including FIGS. 1-14. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

At block 1492, the stream of tuples may be processed. The processing may occur using the set of processing elements operating on the set of compute nodes. The stream of tuples may be processed consistent with the description herein including FIGS. 1-14. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators. Method 1400 concludes at block 1499. Aspects of method 1400 may provide performance or efficiency benefits related to compile-time operation efficiency management in a shared pool of configurable computing resources. Aspects may save resources such as bandwidth, processing, or memory.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method to increase operational efficiency of computer applications at run time, the method comprising:

detecting, for utilization in a shared pool of configurable computing resources, a first set of processing operations of a first application;

detecting, for utilization in the shared pool of configurable computing resources, a second set of processing operations of a second application;

comparing the first set of processing operations of the first application with the second set of processing operations of the second application;

determining, based on comparing the first set of processing operations of the first application with the second set of processing operations of the second application, a substantial match of the first and second processing operations of the first and second applications; and compiling, for utilization in the shared pool of configurable computing resources, a single set of processing operations for both the first and second applications, wherein the single set of processing operations for both the first and second applications are shared during an execution of the first application or the second application.

2. The method of claim 1, further comprising:

establishing, in the shared pool of configurable computing resources, the single set of processing operations for both the first and second applications; and carrying-out, using the single set of processing operations, both the first and second applications.

3. The method of claim 2, further comprising:

preventing establishment of the first set of processing operations of the first application in the shared pool of configurable computing resources;

preventing establishment of the second set of processing operations of the second application in the shared pool of configurable computing resources; and configuring the single set of processing operations for both the first and second applications to fulfill the first and second sets of processing operations of the first and second applications in the shared pool of configurable computing resources.

4. The method of claim 1, wherein the shared pool of configurable computing resources includes a plurality of tenants including both a first tenant and a second tenant, and further comprising:

detecting that the first tenant corresponds to the first application;

detecting that the second tenant corresponds to the second application;

compiling, for utilization in the shared pool of configurable computing resources, the single set of processing operations for both the first and second applications of both the first and second tenants.

5. The method of claim 1, wherein the shared pool of configurable computing resources includes a stream computing environment, and further comprising:

detecting, for utilization in the shared pool of configurable computing resources, a first set of stream computing processing operations of a first stream computing application;

detecting, for utilization in the shared pool of configurable computing resources, a second set of stream computing processing operations of a second stream computing application;

comparing the first set of stream computing processing operations with the second set of stream computing processing operations;

determining, based on comparing the first set of stream computing processing operations with the second set of stream computing processing operations, the substantial match; and compiling, for utilization in the shared pool of configurable computing resources, a single set of stream computing processing operations.

6. The method of claim 5, wherein the shared pool of configurable computing resources includes a plurality of tenants including both a first tenant and a second tenant, and further comprising:

detecting that the first tenant corresponds to the first set of stream computing processing operations of a first Internet of Things (IoT) stream computing application;

detecting that the second tenant corresponds to the second set of stream computing processing operations of a second IoT stream computing application;

compiling, for utilization in the shared pool of configurable computing resources, the single set of processing operations for both the first and second IoT stream computing applications of both the first and second tenants.

7. The method of claim 5, further comprising:

comparing a first stream operator structure of the first set of stream computing processing operations of the first stream computing application with a second stream operator structure of the second set of stream computing processing operations of the second stream computing application;

determining, based on comparing the first stream operator structure of the first set of stream computing processing operations of the first stream computing application with the second stream operator structure of the second set of stream computing processing operations of the second stream computing application, a stream operator structural match of the first and second stream operator structures of the first and second stream computing processing operations of the first and second stream computing applications; and compiling, for utilization in the shared pool of configurable computing resources, a single stream operator structure of the single set of stream computing processing operations for both the first and second stream computing applications.

8. The method of claim 5, further comprising:

comparing a first set of stream operator parameters of the first set of stream computing processing operations of the first stream computing application with a second set of stream operator parameters of the second set of stream computing processing operations of the second stream computing application;

determining, based on comparing the first set of stream operator parameters of the first set of stream computing processing operations of the first stream computing application with the second set of stream operator parameters of the second set of stream computing processing operations of the second stream computing application, a substantial stream operator parameter match of the first and second sets of stream operator parameters of the first and second stream computing processing operations of the first and second stream computing applications; and compiling, for utilization in the shared pool of configurable computing resources, a single set of stream operator parameters of the single set of stream computing processing operations for both the first and second stream computing applications.

9. The method of claim 5, further comprising:

analyzing, with respect to a first subset of the first set of stream computing processing operations of the first stream computing application, a first portion of a first flow graph;

analyzing, with respect to a first subset of the second set of stream computing processing operations of the second stream computing application, a first portion of a second flow graph;

comparing the first portion of the first flow graph with the first portion of the second flow graph;

determining, based on comparing the first portion of the first flow graph with the first portion of the second flow graph, a substantial match of the first portions of the first and second flow graphs; and initiating, in response to determining the substantial match of the first portions of the first and second flow graphs, compilation of the single set of stream computing processing operations for both the first and second stream computing applications.

10. The method of claim 9, further comprising:

analyzing, with respect to a second subset of the first set of stream computing processing operations of the first stream computing application, a second portion of the first flow graph;

analyzing, with respect to a second subset of the second set of stream computing processing operations of the second stream computing application, a second portion of the second flow graph;

comparing the second portion of the first flow graph with the second portion of the second flow graph;

determining, based on comparing the second portion of the first flow graph with the second portion of the second flow graph, a mismatch of the second portions of the first and second flow graphs; and indicating, in response to determining the mismatch of the second portions of the first and second flow graphs, a stop-position with respect to compilation of the single set of stream computing processing operations for both the first and second stream computing applications.

11. The method of claim 9, further comprising:

selecting, with respect to the first subset of the first set of stream computing processing operations of the first stream computing application, a start-position at an initial-operation of the first flow graph.

12. The method of claim 9, further comprising:

selecting, with respect to the first subset of the first set of stream computing processing operations of the first stream computing application, a start-position at a data-ingest-operation of the first flow graph.

13. The method of claim 5, further comprising:

receiving a stream of tuples to be processed by a set of processing elements which operates on a set of compute nodes; and processing, using the set of processing elements operating on the set of compute nodes, the stream of tuples.

14. The method of claim 1, further comprising:

comparing a first structure of the first set of processing operations of the first application with a second structure of the second set of processing operations of the second application;

determining, based on comparing the first structure of the first set of processing operations of the first application with the second structure of the second set of processing operations of the second application, a structural match of the first and second structures of the first and second processing operations of the first and second applications; and compiling, for utilization in the shared pool of configurable computing resources, a single structure of the single set of processing operations for both the first and second applications.

15. The method of claim 1, further comprising:

generating a first set of component data which indicates a first set of components utilized to develop the first set of processing operations of the first application;

generating a second set of component data which indicates a second set of components utilized to develop the second set of processing operations of the second application;

comparing, related to the first and second sets of components, the first set of component data with the second set of component data; and determining, based on comparing the first set of component data with the second set of component data, the substantial match of the first and second processing operations of the first and second applications.

16. The method of claim 1, further comprising:

generating a first set of component dependency data which indicates a first dependency among a first set of components utilized to develop the first set of processing operations of the first application;

generating a second set of component dependency data which indicates a second dependency among a second set of components utilized to develop the second set of processing operations of the second application;

comparing, related to the first and second dependencies, the first set of component dependency data with the second set of component dependency data; and determining, based on comparing the first set of component dependency data with the second set of component dependency data, the substantial match of the first and second processing operations of the first and second applications.

17. The method of claim 1, further comprising:

executing, in a dynamic fashion to compile-time operation efficiency management for utilization in the shared pool of configurable computing resources, each of:

the detecting of the first set of processing operations of the first application, the detecting of the second set of processing operations of the second application, the comparing, the determining, and the compiling.

18. The method of claim 1, further comprising:

executing, in an automated fashion without user intervention, each of:

the detecting of the first set of processing operations of the first application, the detecting of the second set of processing operations of the second application, the comparing, the determining, and the compiling.

19. A system to increase operational efficiency of computer applications at run time, the system comprising:

a memory having a set of computer readable computer instructions, and a processor for executing the set of computer readable instructions, the set of computer readable instructions including:

detecting, for utilization in a shared pool of configurable computing resources, a first set of processing operations of a first application;

detecting, for utilization in the shared pool of configurable computing resources, a second set of processing operations of a second application;

comparing the first set of processing operations of the first application with the second set of processing operations of the second application;

determining, based on comparing the first set of processing operations of the first application with the second set of processing operations of the second application, a substantial match of the first and second processing operations of the first and second applications; and compiling, for utilization in the shared pool of configurable computing resources, a single set of processing operations for both the first and second applications, wherein the single set of processing operations for both the first and second applications are shared during an execution of the first application or the second application.

20. A computer program product to increase operational efficiency of computer applications at run time, the computer program product comprising a computer readable storage medium having program instructions embodied therewith, wherein the computer readable storage medium is not a transitory signal per se, the program instructions executable by a processor to cause the processor to perform a method comprising:

detecting, for utilization in a shared pool of configurable computing resources, a first set of processing operations of a first application;

detecting, for utilization in the shared pool of configurable computing resources, a second set of processing operations of a second application;

comparing the first set of processing operations of the first application with the second set of processing operations of the second application;

determining, based on comparing the first set of processing operations of the first application with the second set of processing operations of the second application, a substantial match of the first and second processing operations of the first and second applications; and compiling, for utilization in the shared pool of configurable computing resources, a single set of processing operations for both the first and second applications, wherein the single set of processing operations for both the first and second applications are shared during an execution of the first application or the second application.

* * * * *